US011259191B2

United States Patent
Chen et al.

(10) Patent No.: US 11,259,191 B2
(45) Date of Patent: Feb. 22, 2022

(54) METHODS AND APPARATUS FOR COVERAGE PREDICTION AND NETWORK OPTIMIZATION IN 5G NEW RADIO NETWORKS

(71) Applicant: Samsung Electronics Co., Ltd., Suwon-si (KR)

(72) Inventors: Hao Chen, Allen, TX (US); Vishnu Ratnam, Plano, TX (US); Young-Han Nam, Plano, TX (US); Joonyoung Cho, Portland, OR (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 16/693,074

(22) Filed: Nov. 22, 2019

(65) Prior Publication Data
US 2020/0169895 A1    May 28, 2020

Related U.S. Application Data

(60) Provisional application No. 62/771,419, filed on Nov. 26, 2018, provisional application No. 62/837,948, filed on Apr. 24, 2019.

(51) Int. Cl.
*H04W 16/18* (2009.01)
*G06N 3/02* (2006.01)
(Continued)

(52) U.S. Cl.
CPC .............. *H04W 16/18* (2013.01); *G06N 3/02* (2013.01); *H04B 17/336* (2015.01);
(Continued)

(58) Field of Classification Search
CPC .... H04W 16/18; H04W 24/08; H04B 17/336; H04B 7/0413; H04B 7/0617; G06N 3/02
(Continued)

(56) References Cited

U.S. PATENT DOCUMENTS 8,478,280 B1    7/2013  Ji et al.
9,439,081 B1    9/2016  Knebl et al.
(Continued)

FOREIGN PATENT DOCUMENTS

WO    2006015427 A1    2/2006
WO    2016001473 A1    1/2016

OTHER PUBLICATIONS

Yisroel Mirsky et al., "Predicting Wireless Coverage Maps Using Radial Basis Networks", 2018 15th IEEE Annual Consumer Communications & Networking Conference, Mar. 19, 2018, 4 pages.
(Continued)

*Primary Examiner* — Obaidul Huq

(57) ABSTRACT

A server, method, and computer-readable storage medium for coverage prediction in wireless networks. The server includes a memory storing instructions and a processor operably connected to the memory, which is configured to execute the instructions to cause the server to identify a region of interest (RoI) for the coverage prediction; determine, using a neural network, a set of values for a system performance metric for areas in the RoI, respectively; and generate the coverage prediction for the RoI which associates the areas in the RoI with a determined value in the set of values. The set of values for the system performance metric is determined based on a plurality of data samples for a set of RoIs which include at least one of building height, terrain height, foliage height, clutter data that classifies land cover, line-of-sight indication data, antenna height, and ground truth data for the system performance metric.

20 Claims, 16 Drawing Sheets

(51) Int. Cl.
  *H04B 17/336* (2015.01)
  *H04W 24/08* (2009.01)
  *H04B 7/06* (2006.01)
  *H04B 7/0413* (2017.01)

(52) U.S. Cl.
  CPC ........... *H04W 24/08* (2013.01); *H04B 7/0413* (2013.01); *H04B 7/0617* (2013.01)

(58) Field of Classification Search
  USPC .................................................. 370/241, 252
  See application file for complete search history.

(56) References Cited

U.S. PATENT DOCUMENTS

| | | |
|---|---|---|
| 2006/0240834 A1 | 10/2006 | Sawaya et al. |
| 2010/0091330 A1* | 4/2010 | Marchesotti ......... G06K 9/3233 358/1.18 |
| 2015/0057005 A1 | 2/2015 | Sun et al. |
| 2015/0350923 A1 | 12/2015 | Wang et al. |
| 2019/0373495 A1* | 12/2019 | Ouyang ................ H04W 16/28 |

OTHER PUBLICATIONS

International Search Report dated Mar. 6, 2020 in connection with International Patent Application No. PCT/KR2019/016406, 3 pages.
Kautz, "Phase-Only Shaped Beam Synthesis via Technique of Approximated Beam Addition", IEEE Transactions on Antennas and Propagation, vol. 47, No. 5, May 1999, pp. 887-894.
Klaine et al., "A Survey of Machine Learning Techniques Applied to Self-Organizing Cellular Networks", IEEE Communications Surveys & Tutorials, vol. 19, No. 4, Fourth Quarter 2017, pp. 2392-2431.
Razavi et al., "A Fuzzy Reinforcement Learning Approach for Self-Optimization of Coverage in LTE Networks", Bell Labs Technical Journal, vol. 15, No. 3, Dec. 2010, pp. 153-175.
Sutton et al., "Reinforcement Learning: An Introduction", Second Edition (Complete Draft), The MIT Press, Nov. 5, 2017, 445 pages.
Hata, "Empirical Formula for Propagation Loss in Land Mobile Radio Services", IEEE Transactions on Vehicular Technology, vol. VT-29, No. 3, Aug. 1980, pp. 317-325.
"3rd Generation Partnership Project; Technical Specification Group Radio Access Network; Study on channel model for frequencies from 0.5 to 100 GHz (Release 16)", 3GPP TR 38.901 V16.0.0 (Oct. 2019), Oct. 2019, 101 pages.
Phaiboon et al., "Mobile Path Loss Prediction with Image Segmentation and Classification", 2007 International Conference on Microwave and Millimeter Wave Technology, Apr. 2007, 4 pages.
Kuno et al., "Prediction Method by Deep-Learning for Path Loss Characteristics in an Open-Square Environment", 2018 International Symposium on Antennas and Propagation (ISAP), Oct. 2018, 2 pages.
Kuno et al., "Convolutional Neural Network for Prediction Method of Path Loss Characteristics considering Diffraction and Reflection in an Open-Square Environment", 2019 URSI Asia-Pacific Radio Science Conference (AP-RASC), Mar. 2019, 3 pages.
El Hammouti et al., "A Machine Learning Approach to Predicting Coverage in Random Wireless Networks", 2018 IEEE Globecom Workshops (GC Wkshps), Dec. 2018, 6 pages.
Sotiroudis et al., "A Neural Network Approach to the Prediction of the Propagation Path-loss for Mobile Communications Systems in Urban Environments", PIERS Online, vol. 3, No. 8, Aug. 2007, pp. 1175-1179.
Kim et al., "Radio Propagation Measurements and Prediction Using Three-Dimensional Ray Tracing in Urban Environments at 908 MHz and 1.9 GHz," IEEE Transactions on Vehicular Technology, vol. 48, No. 3, May 1999, pp. 931-946.
Extended European Search Report regarding Application No. 19888653.3, dated Nov. 25, 2021, 10 pages.

* cited by examiner

METHODS AND APPARATUS FOR COVERAGE PREDICTION AND NETWORK OPTIMIZATION IN 5G NEW RADIO NETWORKS

CROSS-REFERENCE TO RELATED APPLICATION AND CLAIM OF PRIORITY

This application claims priority under 35 U.S.C. § 119(e) to U.S. Provisional Patent Application No. 62/771,419 filed on Nov. 26, 2018, and to U.S. Provisional Patent Application No. 62/837,948 filed on Apr. 24, 2019. The above-identified provisional patent applications are hereby incorporated by reference in its entirety.

TECHNICAL FIELD

The present disclosure relates to a pre-$5^{th}$-Generation (5G) or 5G communication system to be provided for supporting higher data rates Beyond $4^{th}$-Generation (4G) communication system such as Long-Term Evolution (LTE). More particularly, the present disclosure is directed to network optimization using coverage prediction in wireless communication networks.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

Accurate coverage prediction is an important step in cell planning and cell optimization tools. With accurate coverage prediction, operators can identify coverage holes in the network, find best locations for new base stations, and optimizing current base station configuration parameters (i.e., RF parameters) to address coverage hole issues.

One approach for coverage prediction uses a statistical channel model, examples of which include the Hata model and 3GPP channel model. However, the drawback of statistical channel model is that is it not accurate compared to real measurement data. Especially, for mmWave communication, the pathloss from transmitter to receiver may be deeply affected by surrounding RF environment that includes buildings, terrain, etc. Statistic channel models can result in pathloss estimation errors as large as 20 dB or more, which is undesirable for mmWave cell planning and cell optimization.

Another existing approach for coverage prediction utilizes use ray-tracing data. With ray-tracing data, the details on azimuth angle of arrival (AoA), azimuth angle of departure (AoD), zenith angle of arrival (ZoA), zenith angle of departure (ZoD), power for each ray/path between transmitter and receiver can be captured. Therefore, ray-tracing technique can be accurate in predicting the coverage of wireless communication networks. However, ray-tracing can be very expensive and computationally intensive and time-consuming.

In 5G NR, tuning the antenna beam pattern, number of SSB and e-tilt angles to improve the cell coverage is challenging and expensive. In the current commercial deployment, tuning the parameters are often happening during the drive test stage. It takes several days to collect the coverage data in the real trial area and then tune the RF parameters.

SUMMARY

Embodiments of the present disclosure include a server, a method, and a computer-readable medium for coverage prediction in wireless networks. One embodiment is directed to a server that includes a memory storing instructions and a processor operably connected to the memory, which is configured to execute the instructions to cause the server to identify a region of interest (RoI) for the coverage prediction; determine, using a neural network, a set of values for a system performance metric for areas in the RoI, respectively; and generate the coverage prediction for the RoI which associates the areas in the RoI with a determined value in the set of values. The set of values for the system performance metric is determined based on a plurality of data samples for a set of RoIs which include at least one of building height, terrain height, foliage height, clutter data that classifies land cover, line-of-sight indication data, antenna height, and ground truth data for the system performance metric.

In another embodiment, a method for coverage prediction for wireless networks is disclosed. The method includes identifying a region of interest (RoI) for the coverage prediction. Using a neural network, a set of values for a system performance metric is determined for areas in the RoI, respectively. The set of values for the system performance metric is determined based on with a plurality of data samples for a set of RoIs, the plurality of data samples including at least one of building height, terrain height, foliage height, clutter data that classifies land cover, line-of-sight indication data, and ground truth data for the system performance metric. A coverage prediction is generated for the RoI which associates the areas in the RoI with a determined value in the set of values.

In yet another embodiment a non-transitory, computer-readable medium is disclosed. The non-transitory, computer-readable medium stores instructions that, when executed by a processor of a server, cause the server to identify a region of interest (RoI) for the coverage prediction; determine, using a neural network, a set of values for a system performance metric for areas in the RoI, respectively; and generate the coverage prediction for the RoI which associates the areas in the RoI with a determined value in the set of values. The set of values for the system performance metric is determined based on a plurality of data samples for a set of RoIs, and wherein the plurality of data samples include at least one of building height, terrain height, foliage height, clutter data that classifies land cover, line-of-sight indication data, antenna height, and ground truth data for the system performance metric.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

The figures included herein, and the various embodiments used to describe the principles of the present disclosure are by way of illustration only and should not be construed in any way to limit the scope of the disclosure. Those skilled in the art will understand that the principles of the present disclosure may be implemented in any suitably arranged wireless communication system.

As discussed above, coverage prediction can be expensive and time-consuming, yet accurate, or relatively faster but less accurate. Novel aspects of this disclosure recognize the foregoing deficiencies and provide for a system, method, and computer-readable medium for providing coverage prediction that is faster, less expensive, and more accurate than conventional systems and methods. The coverage prediction can be used to optimize coverage of in a networked computing system, such as the networked computing system 100 in FIG. 1.

Figure 1:
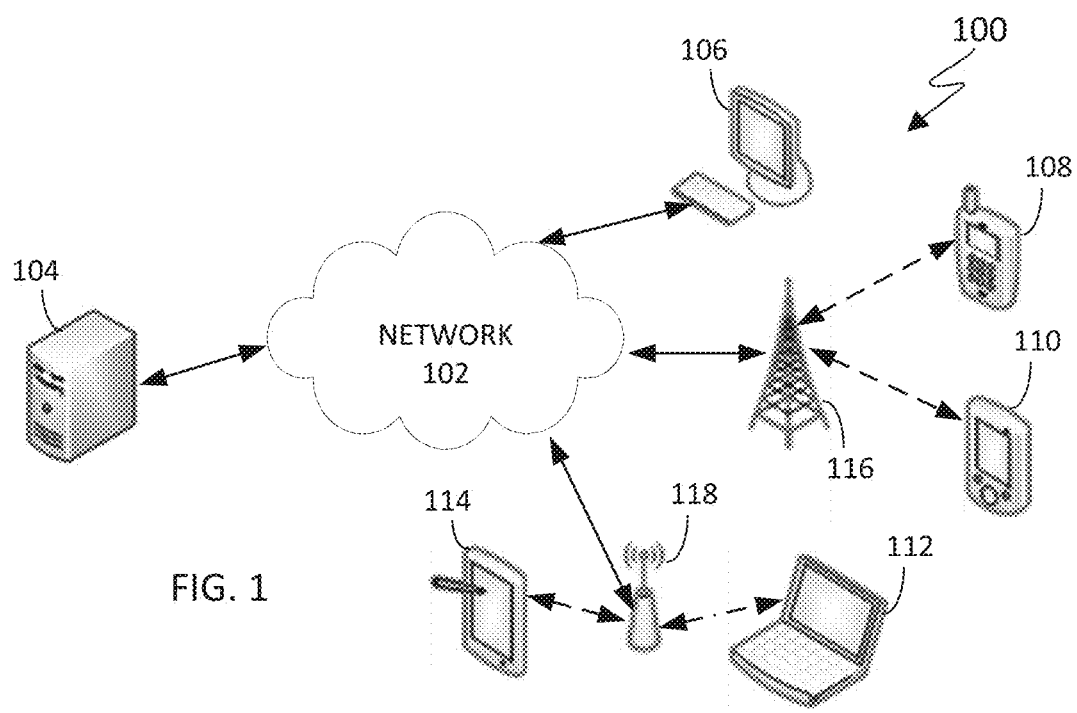
FIG. 1 illustrates an exemplary networked computing system according to various embodiments of this disclosure.

FIG. 1 illustrates an exemplary networked computing system according to various embodiments of this disclosure. The system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100. For example, client devices can include "user equipment" or "UE". User equipment can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

In this example, some client devices 108-114 communicate indirectly with the network 102. For example, the client devices 108-110 communicate via one or more base stations. Depending on the network type, the term "base station" or "BS" can refer to any component (or collection of components) configured to provide wireless access to a network, such as transmit point (TP), transmit-receive point (TRP), an enhanced base station (eNodeB or eNB or gNB), a macrocell, a femtocell, or other similar wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals.

Examples of base stations include cellular base stations 116 (i.e., eNodeB s) and one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, a neural network hosted in the server 104 can be used to for network optimization. For example, users can access the neural network via one or more client devices 106-114 to identify coverage holes in existing wireless networks served by one or more base stations, such as eNodeB 116; identify locations to place new base stations in emerging wireless network locations; or optimize eNodeB configurations, like RF parameters.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
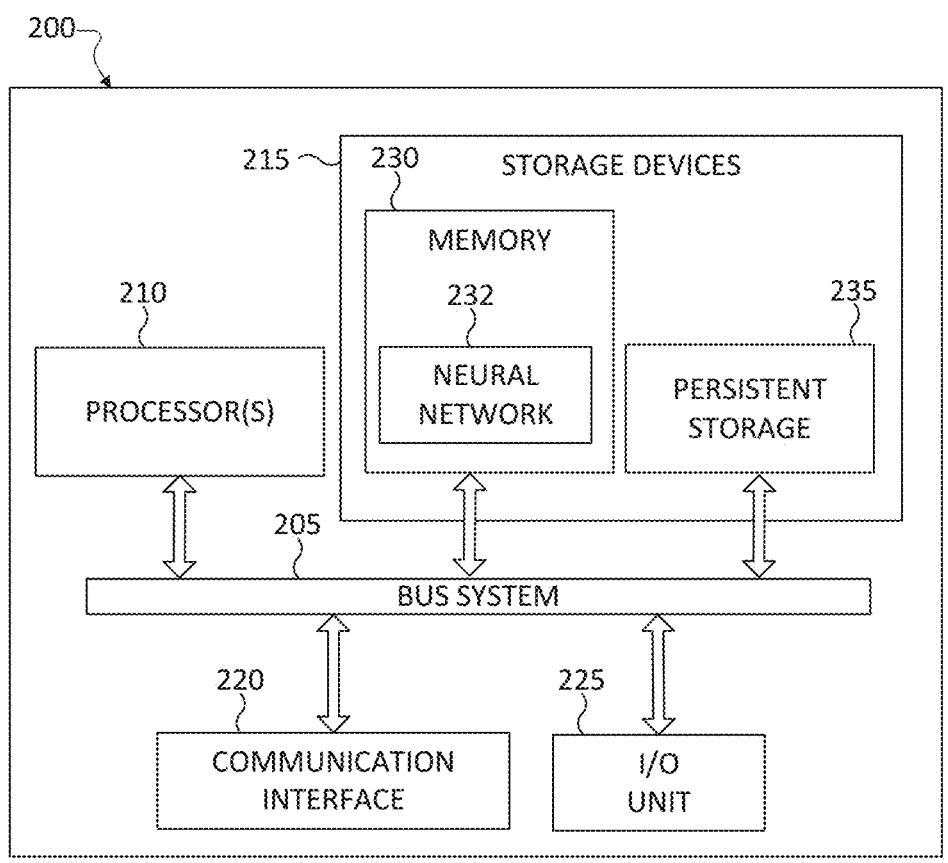
FIG. 2 illustrates an exemplary server in the exemplary networked computing system according to various embodiments of this disclosure.
Figure 3A:
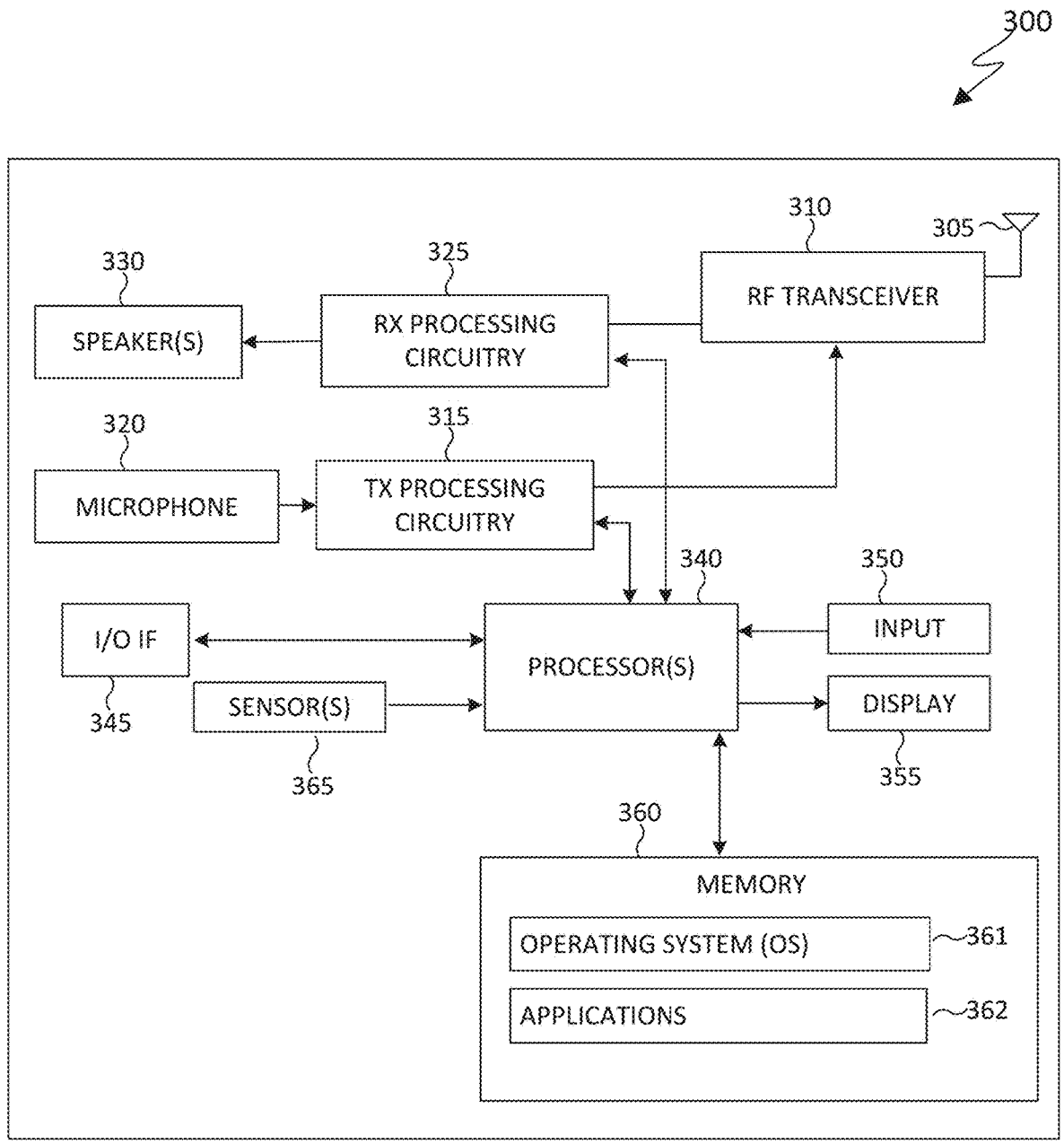
FIG. 3A illustrates an exemplary client device in the exemplary networked computing system according to various embodiments of this disclosure.

FIGS. 2 and 3A/3B illustrate example devices in a computing system according to this disclosure. In particular, FIG. 2 illustrates an example server 200, and FIG. 3A illustrates an example client device 300. The server 200 could represent the server 104 in FIG. 1, and the client device 300 could represent one or more of the client devices 106-114 in FIG. 1.

As shown in FIG. 2, the server 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random-access memory or any other suitable volatile or non-volatile storage device(s). The persistent storage 235 may contain one or more components or devices supporting longer-term storage of data, such as a ready only memory, hard drive, Flash memory, or optical disc.

In a non-limiting embodiment, a neural network 232 can be stored in memory 230. The neural network 232 is a set of algorithms that can be trained to provide coverage predictions for use in cell planning and cell optimization operations. Input provided to the neural network 232 can be provided directly to the server 200 via I/O unit 225, or via a client device communicating with the server 200 via network 102. Once the neural network 232 is trained, coverage predictions can be provided once regions of interest and/or feature information are provided to the neural network 232.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-114. For example, a laptop or desktop computer could have the same or similar structure as that shown in FIG. 2.

As shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the client device 300. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from external devices or an operator. The main processor 340 is also coupled to the I/O interface 345, which provides the client device 300 with the ability to connect to other devices such as laptop computers and handheld computers. The I/O interface 345 is the communication path between these accessories and the main processor 340.

The main processor 340 is also coupled to the keypad 350 and the display unit 355. The operator of the client device 300 can use the keypad 350 to enter data into the client device 300. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

As described in more detail below, the client device can be a UE attached to a base station or cell based on results of a coverage prediction.

Figure 3B:
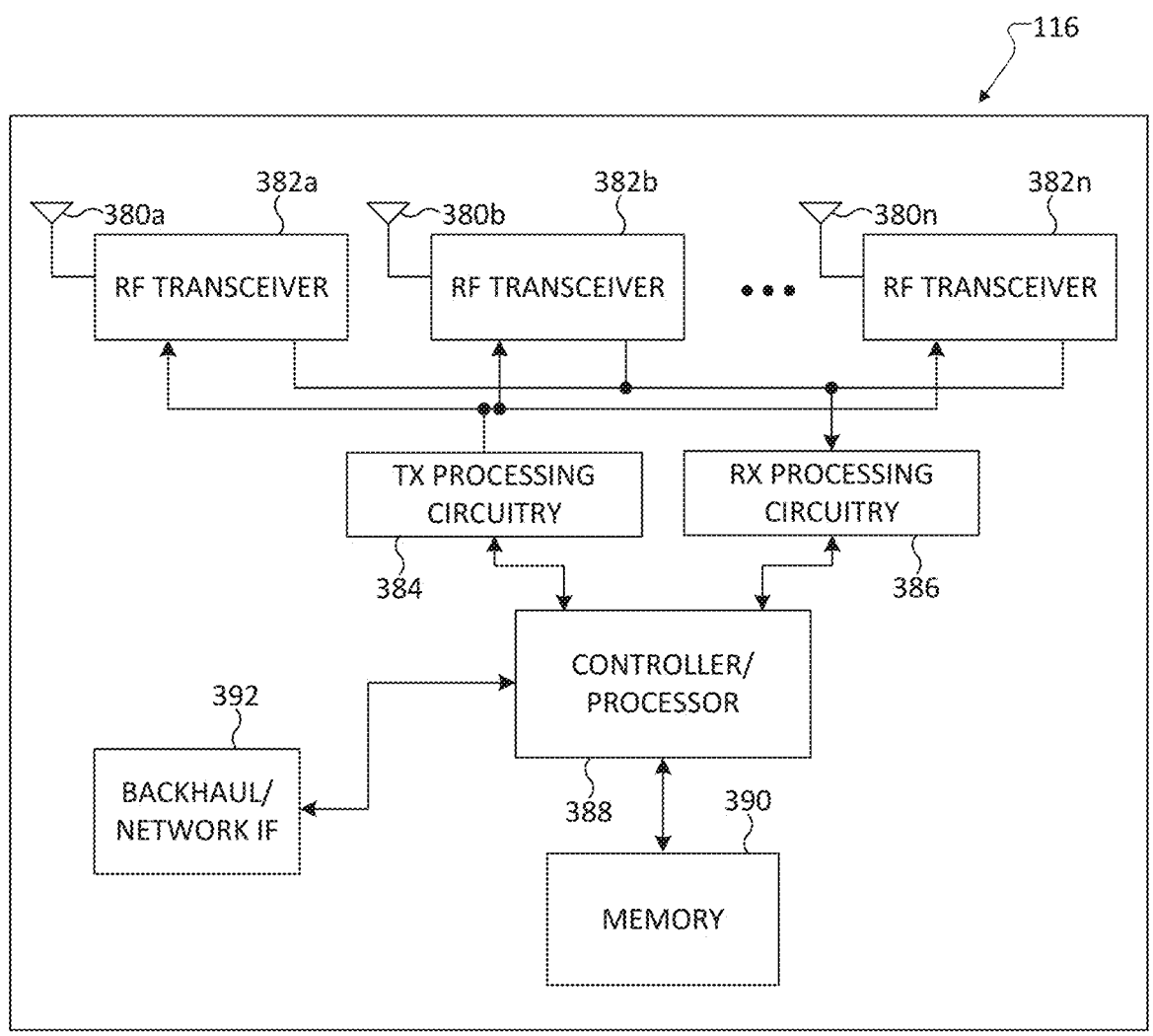
FIG. 3B illustrates an exemplary base station in the exemplary networked computing system according to various embodiments of this disclosure.

FIG. 3B illustrates an exemplary base station in the exemplary networked computing system according to various embodiments of this disclosure. The embodiment of the base station 116 illustrated in FIG. 3B is for illustration only and should not be deemed to limit the scope of this disclosure to any particular implementation of base station.

As shown in FIG. 3B, the base station 116 includes multiple antennas 380a-380n, multiple RF transceivers 382a-382n, transmit (TX) processing circuitry 384, and receive (RX) processing circuitry 386. The base station 116 also includes a controller/processor 388, a memory 390, and a backhaul or network interface 392.

The RF transceivers 382a-382n receive, from the antennas 380a-380n, incoming RF signals, such as signals transmitted by UEs in the network 100. The RF transceivers 382a-382n down-convert the incoming RF signals to generate IF or baseband signals. The IF or baseband signals are sent to the RX processing circuitry 386, which generates processed baseband signals by filtering, decoding, and/or digitizing the baseband or IF signals. The RX processing circuitry 386 transmits the processed baseband signals to the controller/processor 388 for further processing.

The TX processing circuitry 384 receives analog or digital data (such as voice data, web data, e-mail, or interactive video game data) from the controller/processor 388. The TX processing circuitry 384 encodes, multiplexes, and/or digitizes the outgoing baseband data to generate processed baseband or IF signals. The RF transceivers 382a-382n receive the outgoing processed baseband or IF signals from the TX processing circuitry 384 and up-converts the baseband or IF signals to RF signals that are transmitted via the antennas 380a-380n.

The controller/processor 388 can include one or more processors or other processing devices that control the overall operation of the base station 116. For example, the controller/processor 388 could control the reception of forward channel signals and the transmission of reverse channel signals by the RF transceivers 382a-382n, the RX processing circuitry 386, and the TX processing circuitry 384 in accordance with well-known principles. The controller/processor 388 could support additional functions as well, such as more advanced wireless communication functions. For instance, the controller/processor 388 could support beam forming or directional routing operations in which outgoing signals from multiple antennas 380a-380n are weighted differently to effectively steer the outgoing signals in a desired direction. Any of a wide variety of other functions could be supported in the base station 116 by the controller/processor 388. In some embodiments, the controller/processor 388 includes at least one microprocessor or microcontroller.

The controller/processor 388 is also capable of executing programs and other processes resident in the memory 390, such as a basic OS. The controller/processor 388 can move data into or out of the memory 390 as required by an executing process.

The controller/processor 388 is also coupled to the backhaul or network interface 392. The backhaul or network interface 392 allows the base station 116 to communicate with other devices or systems over a backhaul connection or over a network. The interface 392 could support communications over any suitable wired or wireless connection(s). For example, when the base station 116 is implemented as part of a cellular communication system (such as one supporting 5G, LTE, or LTE-A), the interface 392 could allow the base station 116 to communicate with other base stations over a wired or wireless backhaul connection. When the base station 116 is implemented as an access point, the interface 392 could allow the base station 116 to communicate over a wired or wireless local area network or over a wired or wireless connection to a larger network (such as the Internet). The interface 392 includes any suitable structure supporting communications over a wired or wireless connection, such as an Ethernet or RF transceiver.

The memory 390 is coupled to the controller/processor 388. Part of the memory 390 could include a RAM, and another part of the memory 390 could include a Flash memory or other ROM.

RF parameters for the base station 116 can be optimized during cell planning or optimization operations. The optimized RF parameters may be generated by a server hosting a neural network and provided to the base station 116 via the network. Coverage predictions can be used to determine optimized RF parameters as discussed herein.

Although FIGS. 2 and 3A/3B illustrate examples of devices in a computing system, various changes may be made to FIGS. 2 and 3A/3B. For example, various components in FIGS. 2 and 3A/3B could be combined, further subdivided, or omitted and additional components added according to particular needs. As a particular example, the main processor 340 could be divided into multiple processors, such as one or more central processing units (CPUs) and one or more graphics processing units (GPUs). Also, while FIG. 3A illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3A/3B do not limit this disclosure to any particular client device or server or base station.

Figure 4:
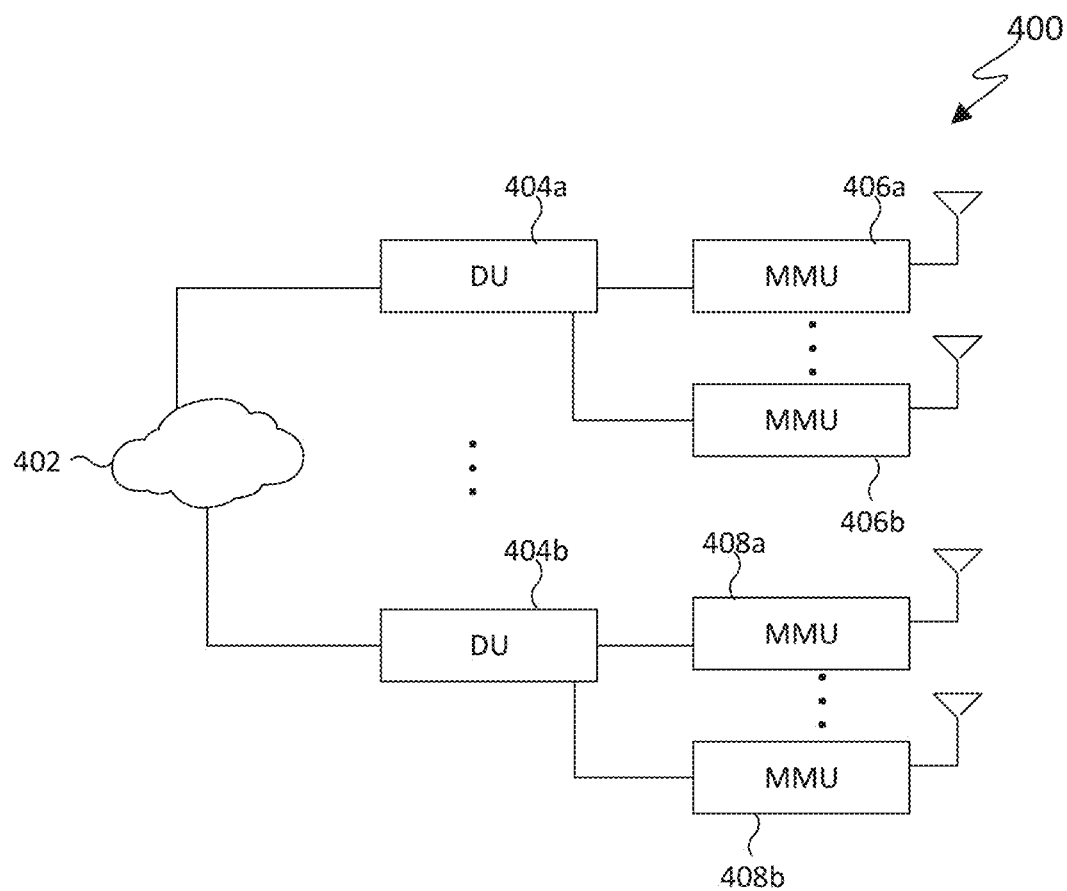
FIG. 4 illustrates an exemplary network architecture for massive multi-input, multi-output (MIMO) communication according to various embodiments of this disclosure.

FIG. 4 illustrates an exemplary network architecture for massive multi-input, multi-output (MIMO) communication according to various embodiments of this disclosure. The network 400 can be included in the computing system 100 in FIG. 1. For example, network 402 may be a part of network 102 supporting communication by data units 404*a* and 404*b*.

In this non-limiting embodiment, data units 404*a* and 404*b* are electronic devices that interface backhaul to an IP network, each of which can support one or more multiple massive MIMO (multi-input-multi-output) units (MMUs) MMUs 406*a*-408*b*. The data units 404*a* and 404*b* can be equipped with at least one of modems, digital signal processors (DSPs), FPGAs (field programmable gate arrays), and memory units. The data units 404*a* and 404*b* can processes information bits to generate intermediate signals that can be passed to the MMUs 406*a*-408*b* for conversion into radio signals. The radio signals can then be transmitted via massive MIMO antennas. In some embodiments, MMUs 406*a*-408*b* may have processing power, in which case the MMUs 406*a*-408*b* include modems, DSPs, FPGAs, and memory units, in addition to RF (radio frequency) hardware and massive MIMO antennas.

RF parameters for massive MIMO communication can be optimized during cell planning or optimization operations. The optimized RF parameters may be generated by a server hosting a neural network and provided to the MMUs 406*a*-408*b* via the network. Coverage predictions can be used to determine optimized RF parameters as discussed in more detail in FIGS. 17-21 that follows.

At least some novel aspects of this disclosure provide for artificial intelligence-based, cell-level coverage predictions for one or more system performance metrics. One non-limiting example of a system performance metric is pathloss. Other system performance metrics can include SINR, cell coverage, throughput, etc. In one embodiment, the coverage predictions can be obtained according to a method that is bifurcated into two phases: an offline neural network (NN) training phase and online application using the trained NN. In another embodiment, the method may also include an online NN training phase.

The methods described herein differ from conventional approaches in that a system performance metric, such as pathloss, can be directly predicted for an entire cell or a region of interest (ROI), including all indoor and outdoor areas. In contrast, conventional methods only provide predictions for point-to-point pathloss. In addition, methods disclosed herein account for the effect of environment and topology of surroundings in determining pathloss from TX to RX, which is not considered in the statistical channel model. In one embodiment, two-dimensional images or matrices that represent environmental features of the ROI are used to predict a system performance metric, such as pathloss. Non-limiting examples of environmental features include height and location of buildings in an ROI, height and location of foliage in an ROI, height and location of terrain in an ROI, and clutter data that describes a type and location of clutter classes in the ROI. As used herein, environmental features may also be referred to more generally as "feature information."

An ROI is an area in which information about a system performance metric is sought. The ROI can be an area that encompasses a base station. The RoI can be of any arbitrary shape, including a rectangular area, a circular area, a continuous connected area, or a set of disconnected areas. In one example, the RoI is a square region with an edge of 512 meters. In one embodiment, the location of the base station may be fixed for every ROI. For example, a base station could be located at the centroid of the ROI so that distance information from the transmitter of the base station to a receiver, such as a UE, is represented by the locations of the pixels relative to the centroid of the RoI. In another embodiment, a location of a prospective BS may be one among a set of possible base station locations. In this embodiment, the BS location may also be fed as an input to the neural network so that coverage predictions can be generated for each of the various prospective base station locations.

For a city area, hundreds or thousands of RoIs can be selected for the purpose of training a neural network to provide coverage predictions. In one embodiment, the neural network can be trained to learn and predict a system performance metric (e.g., pathloss) for a selected RoI from two-dimensional representations of features information, computed features derived from the feature information (e.g., line-of-sight and non-line-of-sight data), and from ground truth data representing measured values corresponding to a system performance metric for locations within the ROI. Once trained, the neural network can provide coverage predictions for the selected ROI, or for one or more different ROIs with reference to feature information for the one or more different RoIs which can include building height, foliage height, terrain height, clutter information and computed features, such as LoS/nLoS features. The output of the neural network can be a coverage prediction of a performance metric, such as pathloss, for the areas in the RoI.

Figure 5:
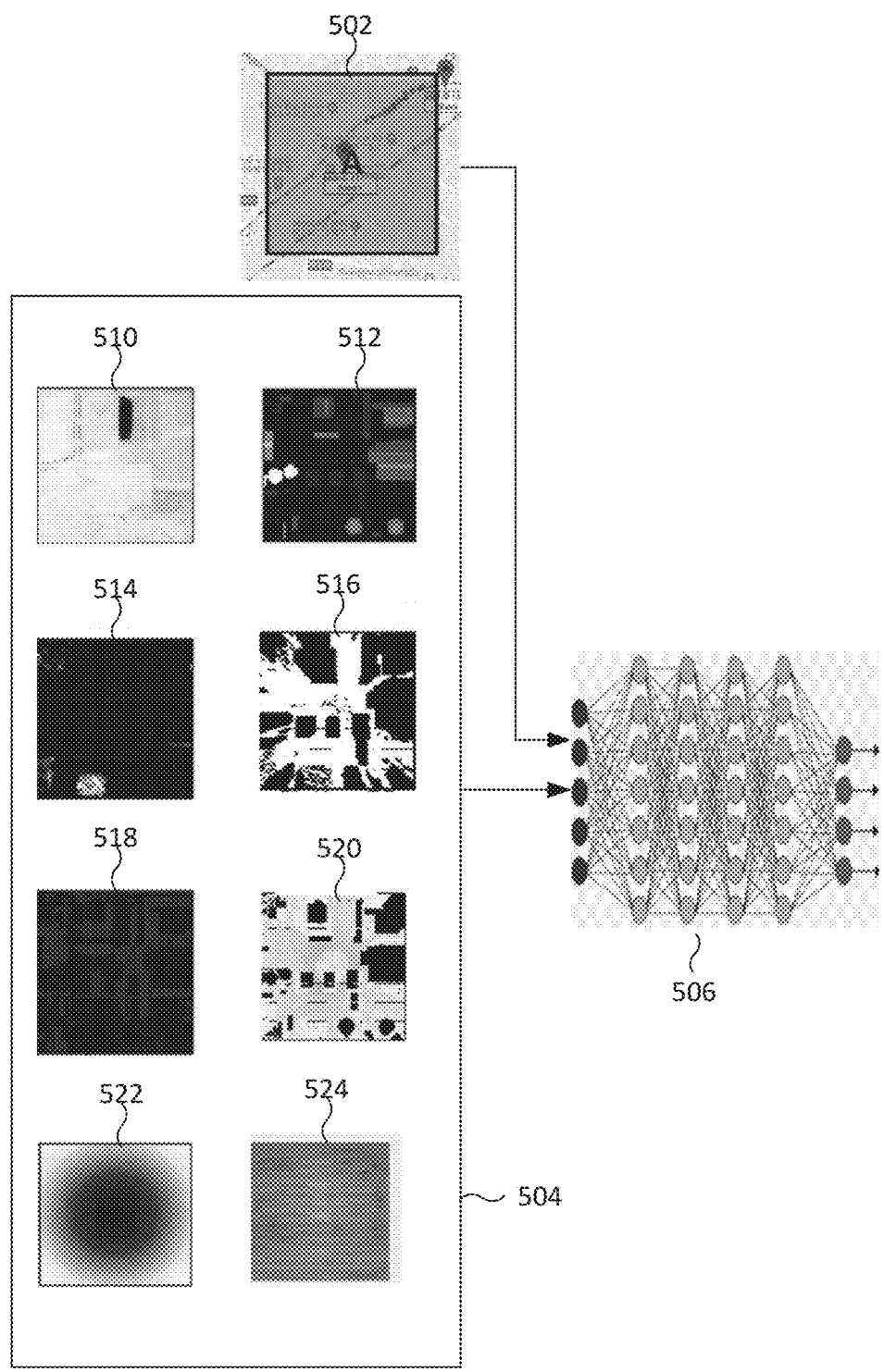
FIG. 5 illustrates neural network training according to various embodiments of this disclosure.

FIG. 5 illustrates neural network training according to various embodiments of this disclosure. A selected ROI 502 and a corresponding data sample 504 is provided to the neural network 506 for training. The data sample 504 includes feature information, some of which can be represented by two-dimensional images, integer-encoded matrices, or a combination of two-dimensional images and integer-encoded matrices.

In this non-limiting example, the feature information included in data sample 504 includes a terrain image 510, a building image 512, foliage image 514, line-of-sight image 516, clutter data image 518, antenna height data 522, and antenna radiation data 524. The terrain image 510, the building image 512, the foliage image 514, and the clutter data image 518 are two-dimensional images with pixel color representing heights of their respective environmental features in the ROI 502. In another embodiment, the two-dimensional images can be replaced by integer-encoded matrices with integer values representing heights, ranges of heights, or clutter classes. Examples of integer encoded clutter matrices are discussed in more detail in FIGS. 8 and 9 that follow.

Figure 7:
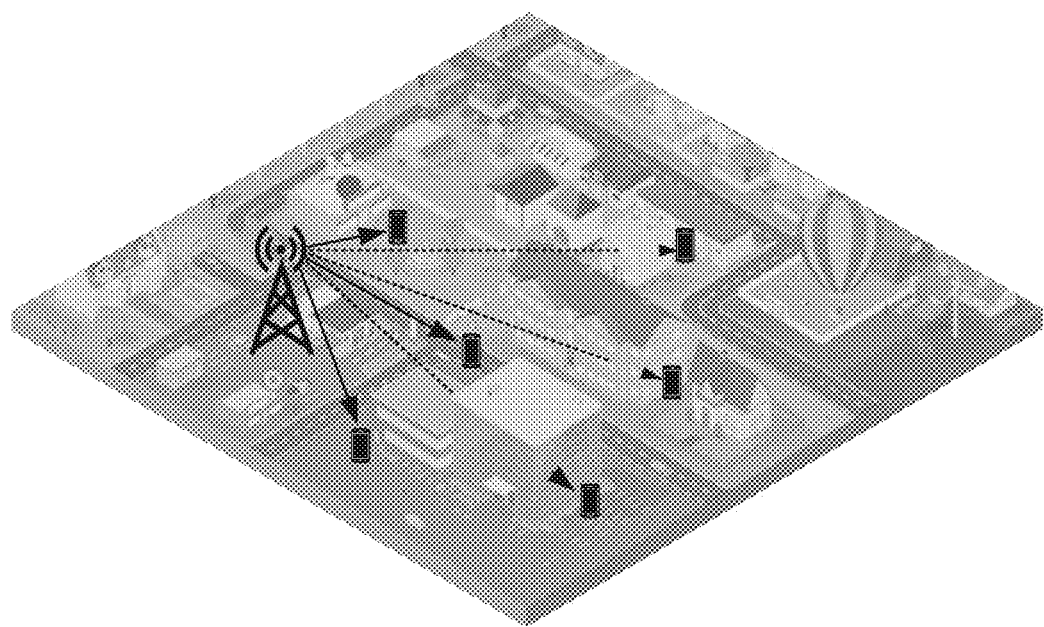
FIG. 7 illustrates line-of-sight in an RoI according to various embodiments of this disclosure.

Line-of-sight image 516 is also a two-dimensional image with pixels representing line-of-sight relative to a reference object or location within the ROI 502. The line-of-sight image 516 can be computed to represent blockage by buildings, by foliage, by terrain, or any combination thereof. The line-of-sight image 516 can be obtained by classical algorithm or by another neural network. In one embodiment, the line-of-sight image 516 can be determined using antenna height data 522, which indicates the height of the transmit antennas in the RoI 502. A pictorial representation of information represented in line-of-sight image 516 is shown in FIG. 7 that follows.

The data sample 504 also includes ground truth image 520, which depicts measured values for a selected system performance metric (e.g., pathloss) with pixels of varying color representing a measured value or a range of measured values at corresponding locations in the ROI 502.

Antenna radiation pattern 524 is a two-dimensional image with pixels representing antenna gain at corresponding areas in the RoI 502. The antenna radiation pattern 524 can be provided to the neural network 506 when a desired coverage prediction relates to receive power.

For the sake of simplicity, the neural network 506 in FIG. 5 is depicted as trained with only a single ROI 502 and its associated data sample 504. However, numerous ROIs and data samples can be provided to the neural network 506 to improve is results. Machine learning or deep learning methods may require large numbers of data samples for training. The more the data provided for training, the better the performance achieved. In one embodiment, the number of data samples used to train the neural network for system performance prediction can be augmented via pre-processing to increase the number of available data samples. In the training phase, both original data and augmented data are input to the neural network 506 for training to improve the prediction performance. In one embodiment of the data augmentation, a set of feature information matrices for each RoI, (e.g., building height matrix $B_r$, tree height matrix $TR_r$, terrain height matrix $TE_r$, LoS/nLoS matrix $L_r$, clutter matrix $C_r$, etc., and the corresponding ground truth matrix, for example pathloss matrix), can be rotated by x-degrees to generate additional data samples. Such rotation by x-degrees can be either clockwise or counter-clockwise, and x can be arbitrary angle or can be among a set of pre-determined angles. For example, x could be from the set of {45°, 90°, 135°, 180°, 225°, 270°, 315°}. In another embodiment, the set of feature matrices for each training RoI, for example, building height matrix $B_r$, tree height matrix $TR_r$, terrain height matrix $TE_r$, LoS/nLoS matrix $L_r$, clutter matrix $C_r$, etc., and the corresponding performance measure, for example pathloss matrix, can be flipped horizontally, vertically, diagonally or along any other axis, to obtain augmented data samples. In yet another embodiment, a combination of both rotation by x-degrees and flipping about an axis can be performed to generate augmented data samples. For example, the feature matrices and performance measure matrix can be first turned over and then rotated by x-degree where x could be a set of {45°, 90°, 135°, 180°, 225°, 270°, 315°}.

Figure 6:
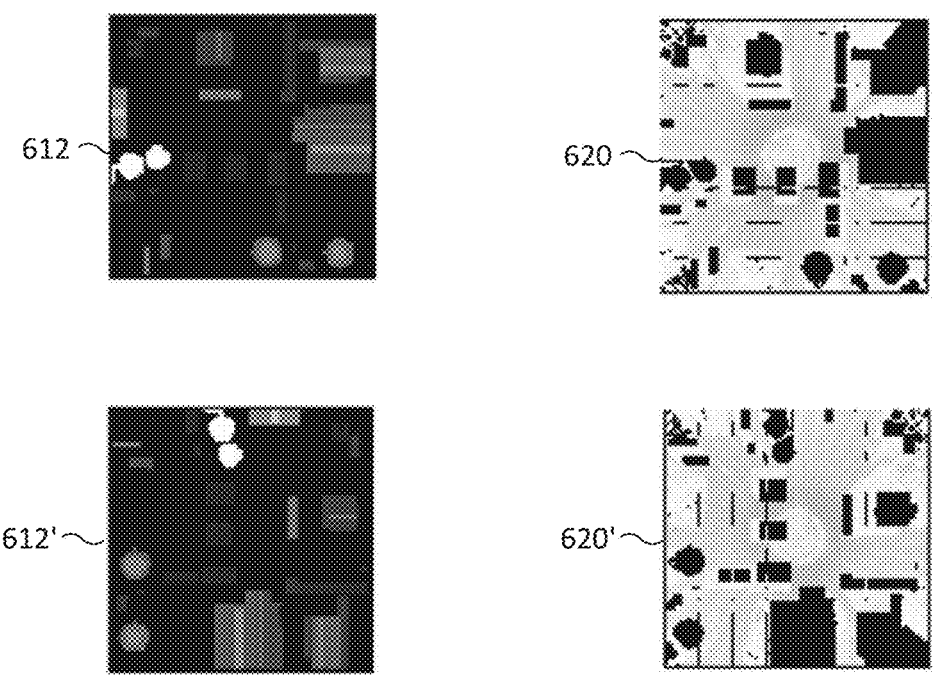
FIG. 6 illustrates data augmentation for training a neural network according to various embodiments of this disclosure.

FIG. 6 illustrates data augmentation according to various embodiments of this disclosure. In particular, a building height matrix 612 is rotated 90 degrees in the clockwise direction to obtain an augmented building height matrix 612'. Likewise, a corresponding performance measure matrix 624 is rotated 90 degrees in the clockwise direction to obtain an augmented performance measure matrix 624'. Only two of feature matrices of a data sample are shown in FIG. 6 for the sake of simplicity; however, other feature information matrices in a data sample can be similarly rotated 90 degrees in the clockwise direction to form a complete data sample with augmented inputs.

FIG. 7 illustrates line-of-sight in an RoI according to various embodiments of this disclosure. The ROI 700 is shown in a perspective view with a transmitting base station and a plurality of UEs disposed throughout the ROI 700. Some of the UEs have line-of-sight to the base station and some do not. In particular, UEs with line-of-sight to the base station are connected to the base station by a solid black arrow. UEs without line-of-sight to the base station are connected to the base station by a dashed arrow. In this non-limiting example, the UEs without line of sight to the base station are all blocked by various buildings. When line-of-sight data is generated for ROI 700, locations in which UEs have line-of-sight to the base station can be depicted by a color (e.g., white) or integer (e.g., 1) and locations in which UEs do not have line-of-sight to the base station can be depicted by another color (e.g., black) or an integer (e.g., 0). The resulting line-of-sight matrix can be input to a neural network as a computed feature.

Figure 8:
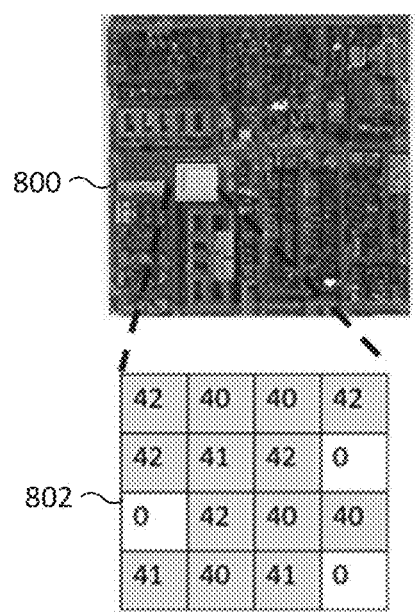
FIG. 8 illustrates an integer-encoded clutter matrix for inputting to a neural network according to various embodiments of this disclosure.

FIG. 8 illustrates an integer-encoded clutter matrix for inputting to a neural network according to various embodiments of this disclosure. The integer-encoded clutter matrix 802 is created for a quantized ROI 800, which is depicted as a square that encompasses various clutter classes. A clutter class is a designation that identifies the type of land cover in an ROI which can include roadways, railways, parking lots, grasslands, bodies of water, buildings of various heights, etc.

Each of the integer values in the integer-encoded clutter matrix 802 represents a clutter class at a given location in the quantized ROI 800. For example, the integer value of 40 can correspond to a highway, the integer value of 41 can correspond to a railway, and the integer value of 42 can represent bare ground. If necessary, more granular clutter data can be provided to a neural network by generating binary matrices to represent clutter classes, as can be seen in FIG. 9.

Figure 9:
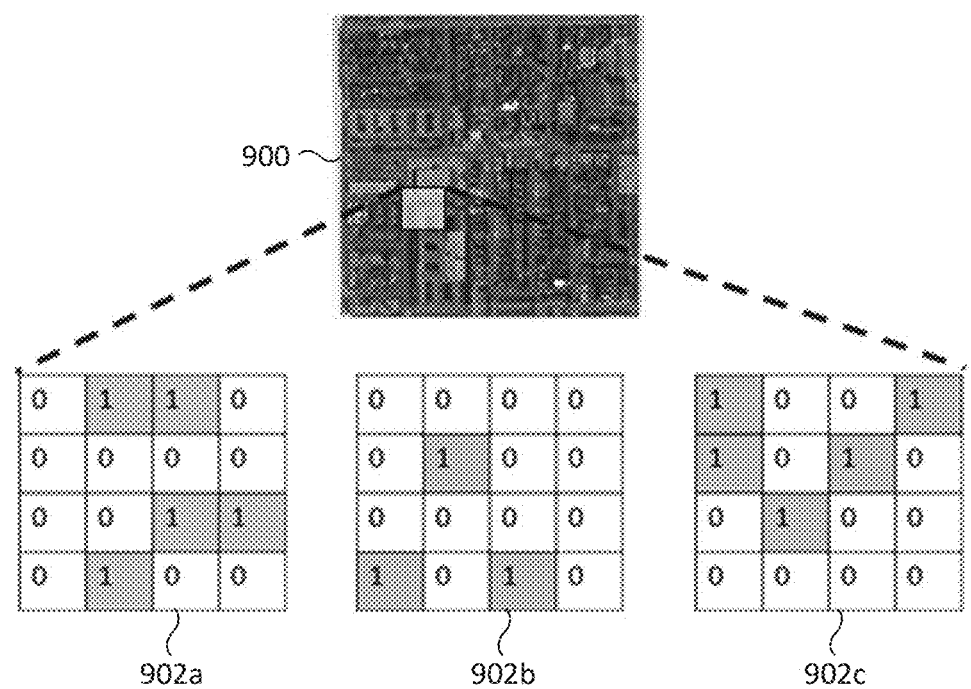
FIG. 9 illustrates "one-hot encoding" of clutter matrix for inputting to a neural network according to various embodiments of this disclosure.

FIG. 9 illustrates "one-hot encoding" of a clutter matrix for inputting to a neural network according to various embodiments. In this illustrative embodiment in FIG. 9, the highlighted area in the quantized ROI 900 includes only three types of clutter classes, each of which is represented by a binary matrix indicating if the clutter is present in an area of the RoI (e.g., assigned with an integer value of 1) or if the clutter is not present in an area of the RoI (e.g., assigned with an integer value of 0).

Binary clutter matrix 902a represents a highway clutter class with an integer value of 1 indicating the location of highways in the highlighted portion of RoI 900. Binary clutter matrix 902b represents a railway clutter class with an integer value of 1 indicating the location of railways in the highlighted portion of RoI 900. Binary clutter matrix 902c represents a bare ground clutter class with an integer value of 1 indicating the location of bare ground in the highlighted portion of RoI 900.

In some embodiments, all clutter classes may be represented by binary images or binary matrices rather than using the generalized clutter matrix shown in FIG. 8. In other embodiments, binary images or binary matrices can be used in addition to the generalized clutter matrix to represent certain clutter classes in more detail.

Feature information and ground truth data collected for one or more RoIs can be input to a neural network for training. The input allows the neural network to learn how the feature information results achieve the system performance metric represented by the ground truth data. Once trained, the neural network can be provided with a target RoI and its associated feature information, along with optional computed features. The output of the neural network can be a coverage prediction that associates a system performance metric (e.g., pathloss or coverage) with areas in the RoI. Other system performance metrics, including SINR and throughput could also be output from the neural network, depending upon the input provided. A corresponding flowchart is shown in the following figure.

Figure 10:
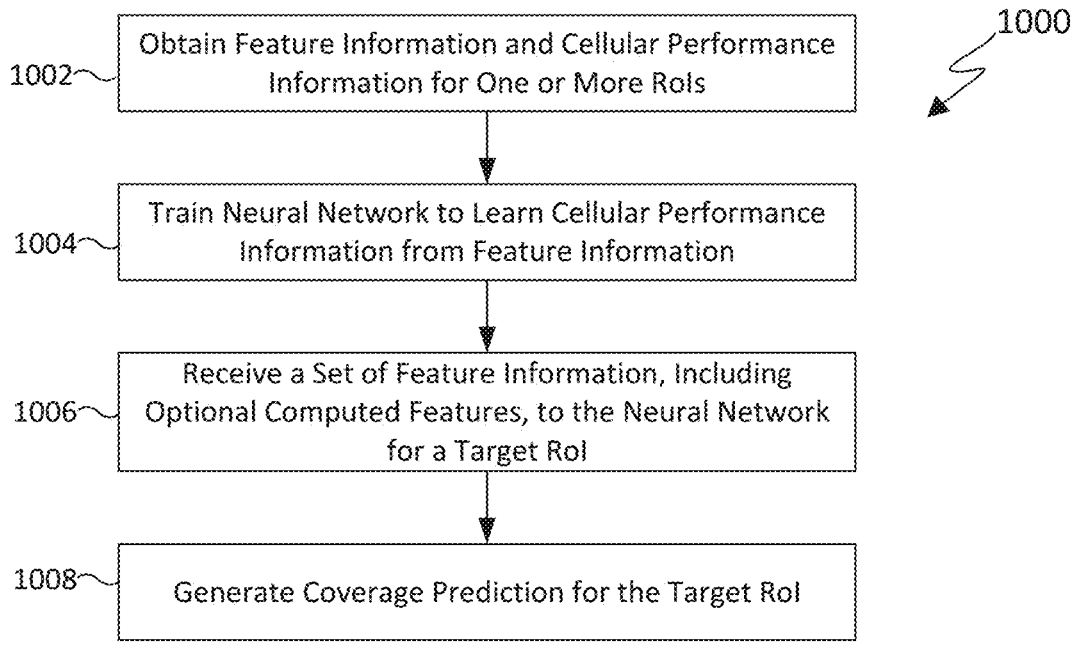
FIG. 10 illustrates a flowchart for generating coverage predictions according to various embodiments of this disclosure.

FIG. 10 illustrates a flowchart for generating coverage predictions according to various embodiments of this disclosure. The operations of flowchart 500 can be implemented in a server, such as server 200 in FIG. 2, which can be included in a networked computing system, such as networked computing system 100 in FIG. 1.

The flowchart 1000 begins at operation 1002 by obtaining feature information and cellular performance information for one or more RoIs. Examples of feature information can include height of all buildings throughout each of the one or more RoIs (i.e., building height), height of terrain throughout each of the one or more RoIs (i.e., the terrain height), height of foliage throughout each of the one or more RoIs (i.e., foliage height), and clutter data that describes land cover throughout each of the one or more RoIs. Cellular performance information, which may also be referred to herein as "ground truth data," is data measured for each of the one or more RoIs that relates to a system performance metric that will be predicted in operation 1008.

In operation 1004, a neural network is trained to learn the cellular performance information from the feature information obtained in operation 502. For example, the neural network can be trained to learn how feature information achieves the cellular performance data. A more detailed discussion regarding neural network training is provided in FIGS. 11 and 12 that follows.

After operation 1004, the neural network is trained to be able to provide coverage predictions for a target RoI if the requisite feature information is provided. Thus, in operation 1006, a set of feature information is provided to the trained neural network for a target RoI. Computed features, such as line-of-sight data, may be obtained. In operation 1008, a coverage prediction for the RoI is generated. The coverage prediction includes values of a system performance metric for areas in the target RoI.

Figure 11:
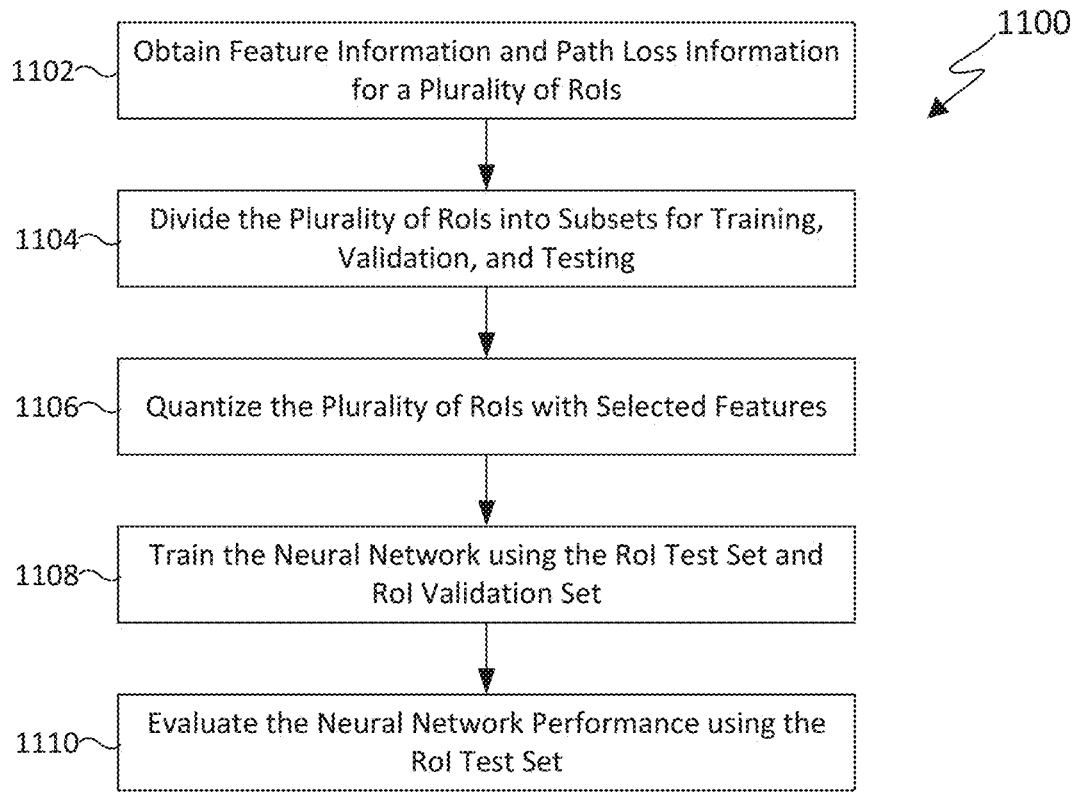
FIG. 11 illustrates a flowchart for training a neural network according to various embodiments of this disclosure.

FIG. 11 illustrates a flowchart for training a neural network to provide coverage predictions according to various embodiments of this disclosure. Operations in flowchart 1100 can be implemented by a server, such as server 200 in FIG. 2, in a networked computing system, such as networked computing system 100 in FIG. 1. In this illustrative example, the coverage prediction generated by operations of flowchart 1100 is pathloss; however, in other embodiments the coverage prediction can be substituted with or include other system performance metric such as SINR, interference, RSRP, coverage, etc.

In operation 1102, feature information and pathloss information is obtained for a plurality of RoIs. In other words, a plurality of data samples are obtained for a corresponding plurality of RoIs. The input features can be obtained for example, from geographical survey maps or by using a neural network/algorithm to extract such information from satellite images. The pathloss data (i.e., system performance metric) can be obtained, for example, using ray-tracing for different BS locations and/or by performing channel measurements to obtain ground truth data.

In operation 1104, the plurality of RoIs are divided into sets, namely a training set, validation set, and test set. The RoIs can be randomly assigned to a set or assigned deterministically. For example, specific RoIs may be assigned one of the various RoI sets to ensure that each of the various clutter features are sufficiently represented in each of the training set, validation set, and test set. Likewise, the number of RoIs allocated to each of the RoI sets can be fixed, randomly assigned, or assigned deterministically.

In operation 1106, each of the plurality of RoIs are quantized and the corresponding feature information is selected and encoded. In some embodiments, feature information is provided to the neural network as two-dimensional matrices or images. For example, the RoI may be quantized into small regions, with each region being represented as a pixel of the image or an element of a two-dimensional matrix. For example, the quantized region can be an x-by-x area, where x represents the distance between two quantized regions. Each input feature, such as terrain height can then be encoded as a pixel or a two-dimensional matrix with the value at each pixel or matrix element representing the height for the corresponding small quantized region of the RoI. The value assigned to each pixel or matrix entry can be any arbitrary function of the values for the corresponding quantized region. For example, the value of building height, tree height, terrain height, clutter information could be the average value over all pixels of the represented x-by-x area. The LoS/nLoS value could be an OR function over all pixels of the represented x-by-x area.

Therefore, for the selected RoI r, we have a set of feature matrices, for example, building height matrix $B_r$, tree height matrix $TR_r$, terrain height matrix $TE_r$, LoS/nLoS matrix $L_r$, clutter matrix $C_r$, etc. The true value of the pathloss for the selected RoI, could be represented by a pathloss matrix $P_r$, where $p_{ij}$ is the element at its ith row and jth column and represents the pathloss value at the corresponding small quantized region. The output of the neural network is regarded as an estimation of the pathloss matrix $\hat{P}_r$ (i.e., a coverage prediction for pathloss) based on a combination set of the mentioned features:

$$\hat{P}_r = f(B_r, TR_r, TE_r, L_r, C_r, W),$$

where W represents the weights of the neural network. In another method, only a subset of the features is input to the neural network, for example, only LoS/nLoS matrix $L_r$, clutter matrix $C_r$, and terrain matrix $TE_r$ are be input to the neural network.

In another embodiment, input matrices representing feature information are preprocessed and encoded before they are input to the neural network. The preprocessing and encoding operation include normalization, removal of an average value, addition of a constant value to all elements of the matrix, division by a constant to all elements of the matrix, etc. For example, in one embodiment the clutter information for the RoI can be encoded as a single image/matrix with an integer value assigned to each pixel/entry corresponding to the clutter class as discussed in more detail in FIGS. 8 and 9. In another embodiment, a subset of important input features can be selected, and only these subsets can be used to train the neural network. Such features can be obtained, for example, by statistical tests, by using domain expertise, or by ranking feature importance via use of random forest, etc.

In operation 1108, the NN is trained using the inputs from training and validation RoIs. In a non-limiting embodiment, the neural network is a U-net. A typical U-net structure includes a convolution layer and deconvolution layer. Input data will first go through convolutional layer to learn the abstract information about a system performance metric (i.e., pathloss) from the input data. Then the abstract information will go through deconvolutional layer to reconstruct the system performance metric results. In order to keep the detailed information, there are direct connections between convolutional layer and deconvolution layers. In this design, both abstract information and detailed information can be used to learn the system performance metric from input data. In another embodiment, an encoder-decoder structure is used to learn the system performance metric from input data. In yet another embodiment, Resnet and Imagnet are used to learn the system performance metric from input data.

In operation 1110, the NN performance is evaluated using the RoI test set. In other words, the predicted pathloss is compared to measured pathloss from the ground truth data to quantify performance of the NN. In a non-limiting embodiment, the performance of the NN is quantified using a root mean square error (RSME) prediction metric ($R_r$) that compares the predicted system performance metric with the corresponding ground truth data. In one embodiment, the system performance metric is pathloss, but can also include coverage, SINR, etc. Further, the predicted system performance metric and the ground truth data can be represented in matrix form. As an example, the RMSE of predicted pathloss matrix and the true pathloss for one RoI can be expressed in the following equation:

$$R_r = \sqrt{\frac{1}{M} \sum_{i,j} |p_{ij} - \hat{p_{ij}}|^2},$$

where M denotes the number of elements in the matrix P. The pathloss can be measured either in linear scale or in logarithmic scale (decibels) in the aforementioned equation. In another embodiment a weighted or truncated averaging of the RMSE may performed. As an example, the truncated averaging may only consider those locations of the map where the true pathloss $p_{ij}$ is above or below a certain minimum threshold. As another example, the weighted RMSE may assign higher weight to the regions with lower "true" pathloss values. Depending upon the desired performance prediction, the above averaging over M may include all areas of the RoI, only outdoor areas of RoI, only on-road areas of RoI etc. The average RMSE of the training sample set can be expressed as:

$$\overline{R_{Train}} = \frac{1}{|S_{train}|} \sum_{r \in S_{train}} R_r,$$

where $|S_{train}|$ represents the number of training data-samples. During the training stage, $\overline{R_{Train}}$ can be used as a metric to train the NN, the weights of NN can be trained so that $\overline{R_{Train}}$ is minimized, i.e., $$W^* = \underset{W}{\mathrm{argmin}} \overline{R_{Train}}.$$

In another embodiment, the maximum RMSE of the training sample set can be used as the prediction metric to train the NN, where the maximum RMSE of the training sample could be expressed as:

$$\widehat{R_{Train}} = \max_{r \in S_{train}} R_r.$$

In this case, the NN is trained so that the worst cell performance, for example, pathloss, prediction is improved, i.e., $$W^* = \underset{W}{\mathrm{argmin}} \widehat{R_{Train}}.$$

In yet another method, the minimum RMSE of the training sample set could be used as the prediction metric to train the NN, the minimum RMSE of the training sample could be expressed as:

$$\widetilde{R_{Train}} = \min_{r \in S_{train}} R_r.$$

In this case, the NN is trained so that the best cell performance, for example, pathloss, prediction is improved, i.e., $$W^* = \underset{W}{\arg\min} \widetilde{R_{Train}}.$$

In yet another method, any function of the RMSE over all training samples can be used to train the NN.

Figure 12:
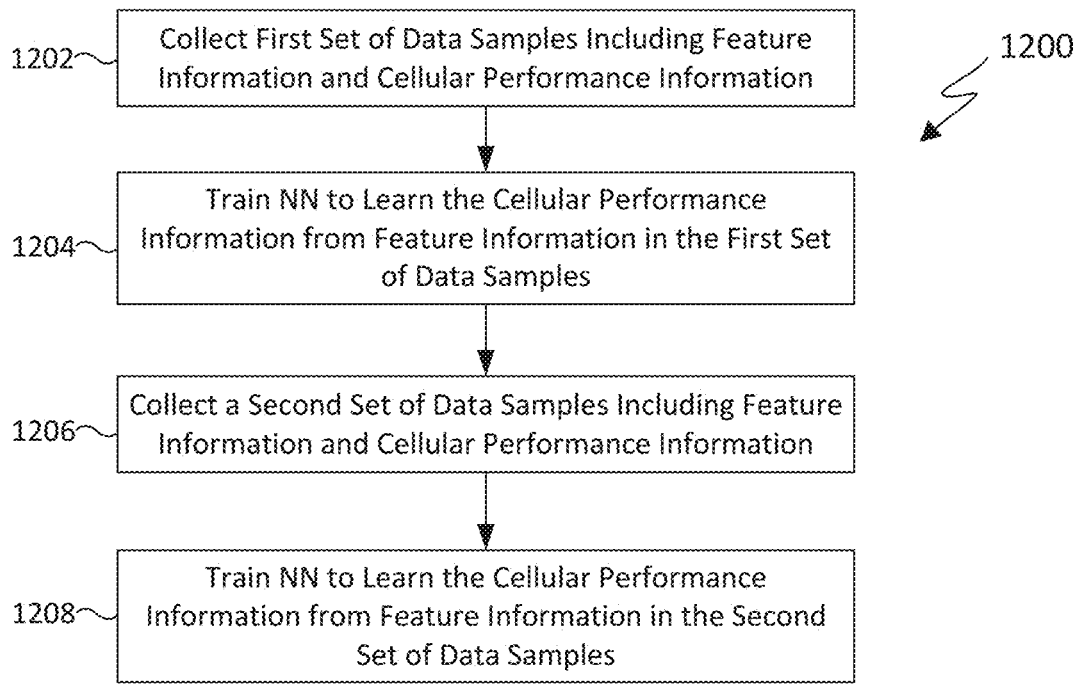
FIG. 12 illustrates a flowchart for training a neural network using transfer learning according to various embodiments of this disclosure.

FIG. 12 illustrates a flowchart for training a neural network using transfer learning according to various embodiments of this disclosure. Operations in flowchart 1200 can be implemented by a server, such as server 200 in FIG. 2, in a networked computing system, such as networked computing system 100 in FIG. 1.

Transfer learning involves training a neural network with multiple sets of data samples in a sequential manner. For example, a neural network can be trained using one set of data samples, such as data samples from simulation platform with a statistic wireless channel model or a ray-tracing channel model. After training the neural network on the simulation platform, the NN can be trained next using a second set of data samples. For example, the second set of data samples could be from real field test data including feature information and measured cellular performance information (i.e., ground truth data). The neural network can be further trained on a third or fourth set of data samples, if any. After the neural network is trained on all sets of data samples, the neural network can be released to generate coverage predictions.

Flowchart 1200 begins at operation 1202 by collecting a first set of data samples that includes feature information and cellular performance information (i.e., ground truth data). A neural network is trained to learn the cellular performance information from the feature information in the first set of data samples. Thereafter, a second set of data samples, which includes feature information and cellular performance data, is collected. The neural network is trained to learn the cellular performance information from the feature information in the second set of data samples. Once the neural network is trained using the first set of data samples and the second set of data samples, the neural network can be released to generate coverage predictions.

Figure 13:
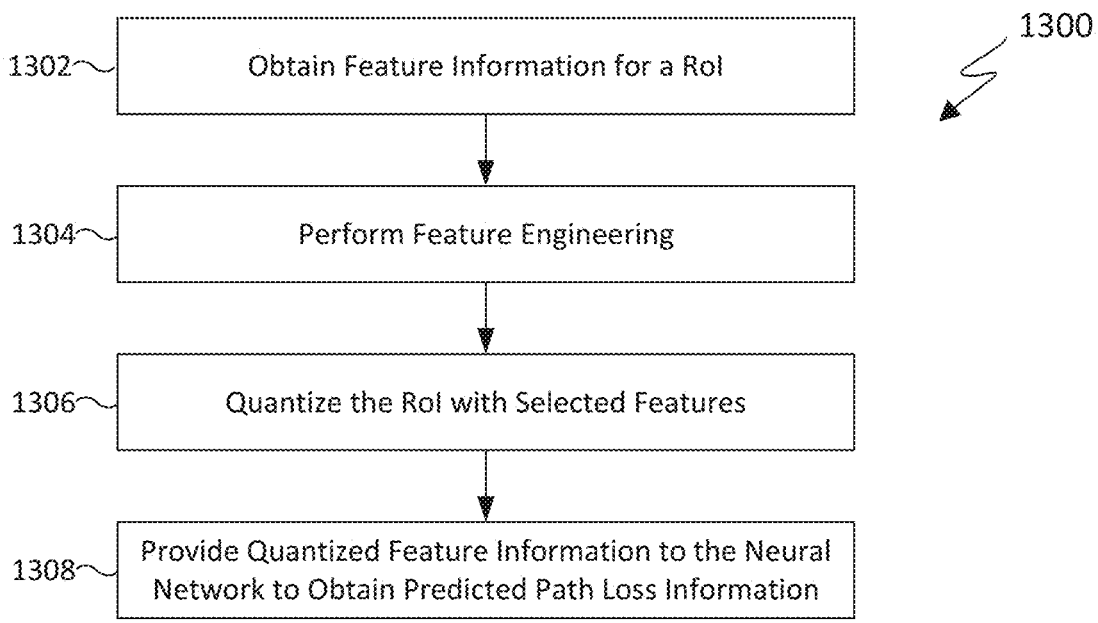
FIG. 13 illustrates a flowchart for generating a coverage prediction according to various embodiments of this disclosure.

FIG. 13 illustrates a flowchart for generating a coverage prediction according to various embodiments of this disclosure. Operations in flowchart 1300 can be implemented by a server, such as server 200 in FIG. 2, in a networked computing system, such as networked computing system 100 in FIG. 1. In addition, the coverage prediction provided by flowchart 1300 provides a pathloss system performance metric; however, in other embodiments the coverage prediction can relate to a different system performance metric.

In operation 1302, a set of feature information is obtained for an RoI. For a coverage prediction relating to pathloss, the set of feature information can include a terrain image, a building image, foliage image, line-of-sight image, and clutter data.

In operation 1304, feature engineering is performed. The feature engineering provides computed features, such as line-of-sight data. In operation 1306, the RoI is quantized and the set of feature information is processed to assign each of the quantized areas in the RoI to be associated with the set of feature information. In operation 1308, the quantized feature information is provided to a trained neural network to obtain predicted pathloss information for areas in the RoI (i.e., coverage prediction for pathloss).

Coverage predictions may also include receive power in areas of an RoI. In one embodiment, the receive power for areas in an RoI can be determined based on the pathloss from the transmitter to each of the areas in the RoI, the transmit power, and the transmit antenna gain. The pathloss can be obtained from the pathloss prediction methods. The TX power is known for a given transmitter and base station. The antenna gain could also be known based on the antenna radiation pattern. Therefore, the receive power at a each of the areas in an RoI can be calculated. For example, if a given region quantized to obtain an x-by-x matrix with each area identified by indices, e.g., (i,j), the receive power at a location $rx_{ij}$ [dBm] can be approximated as:

$$rx_{ij} = Pt + g_{ij} - p_{ij}.$$

where Pt [dBm] is transmit power, $g_{ij}$ [dBm] is the antenna gain to the location (i,j), and $p_{ij}$ [dBm] is pathloss to the transmitter.

Since the location inside the pixel may be relatively constant with respect to the base station, which can be at the center of the matrix, the elevation angle of departure and azimuth angle of departure from the TX to any location in the selected area/ROI can be calculated. In this case, a radiation pattern of base station antenna can be provided which associates antenna gain with corresponding locations in an ROI. In a non-limiting embodiment, the antenna radiation pattern is provided in an antenna radiation matrix G.

Here the element (i,j)-th element of G is $g_{ij}$ which can be the antenna gain to the location (i,j) according to the LoS angle. When calculating the antenna radiation matrix, a global coordination system could be used to calculate the departure angles. In this case, different antenna boresight angles and tilt angles will be reflected in the antenna gain matrix G.

In another embodiment, a modified antenna radiation matrix $\tilde{G}$ can be constructed for the RoI whose (i,j)-th element $\tilde{g}_{ij}$ is the LoS antenna gain to the location (i,j) if the corresponding location has a LoS path to the base station. This information can be obtained by computing the LoS/nLoS matrices for the RoI. For the remaining locations (i,j), a different antenna gain value may be used such as, for example, omni-directional antenna gain or an average antenna gain over a local steradian sector around the LoS path.

In another embodiment, the transmit power and antenna radiation matrix can be directly input into the neural network, so that the output of the neural network directly predicts the received power. In this method, the input features could be, but are not limited to a combination of building height matrix $B_r$, tree height matrix $TR_r$, terrain height matrix $TE_r$, LoS/nLoS matrix $L_r$, clutter matrix $C_r$, TX antenna radiation matrix $G_r$, transmit power matrix Pt, RX antenna radiation matrix $H_r$, etc, where the transmit power matrix is a matrix with all the same value which is the transmit power. In another embodiment, transmit power can be included into the TX antenna radiation matrix as a scaling factor. The ground truth matrix is the received power matrix instead of the pathloss matrix.

Coverage in a cellular network is related to the cell association, i.e., each point or UE in the region may connect to one BS or one cell. A point or UE may connect to the cell with the strongest received power, or other system metric. If a point or a UE could successfully establish a radio resource control (RRC) connection with the BS or cell, then the UE or point is covered by that cell. Usually SINR could be used as a metric to decide whether a UE or a point is connected or not. Therefore, methods for coverage prediction is analogous to methods for predicting the SINR of a cell. Hence, both received power and interference may be needed for coverage prediction. In some embodiments, a cell coverage prediction procedure can be based on the AI-based pathloss prediction procedure or based on the AI-based received power prediction procedure. Different procedures can be designed when the output of AI networks is different. One embodiment of a coverage prediction procedure is described with reference to FIG. 14.

Figure 14:
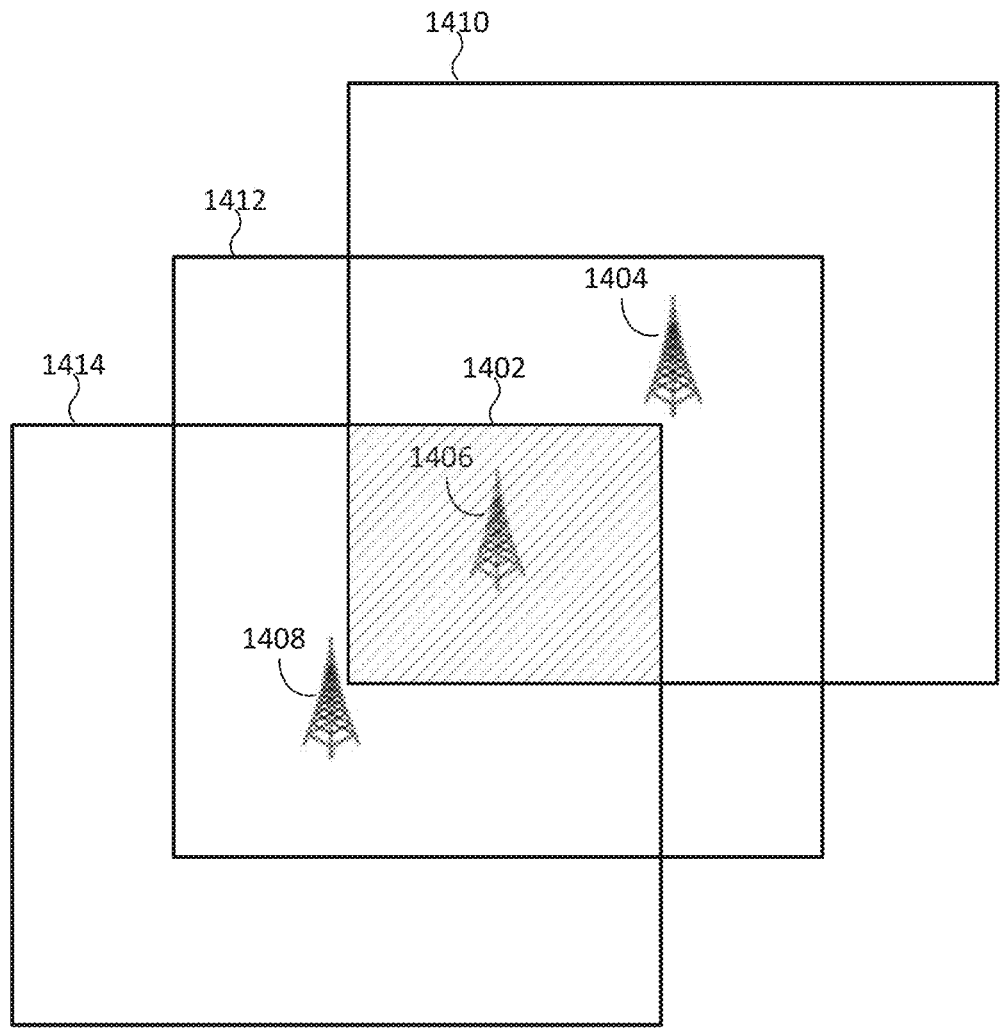
FIG. 14 depicts an illustration for coverage prediction according to various embodiments of this disclosure.

FIG. 14 depicts an illustration for coverage prediction according to various embodiments of this disclosure. In one embodiment, when coverage prediction utilizes a neural network that outputs a pathloss matrix from a transmit point to areas in a region of interest, the coverage prediction procedure begins by identifying an RoI 1402, which is identified by a shaded square. Next, surrounding base stations are selected. The selection of surrounding base stations can be based on any number of criteria, such as a first criterion that the base stations are within a distance threshold to the center of the RoI 1402. A second criterion can be selection of base stations that are within a distance threshold from the edges of the RoI 1402. A third criterion can be selection of the surrounding base stations having at least a threshold value of receive signal power at any point in RoI 1402. The threshold can be selected so to guarantee that interference that will affect the coverage performance will be captured. One exemplary threshold is the noise level.

In FIG. 14, base stations 1404, 1406, and 1408 are deemed to satisfy the base station selection criterion. A prediction region is set to encompass each of the selected base stations as well as the RoI 1402. Thus, prediction region 1410 is set to encompass base station 1404 as well as RoI 1402, prediction region 1412 is set to encompass base station 1406 and the RoI 1402, and prediction region 1414 is set to encompass base station 1408 and RoI 1402. For each of the prediction regions 1410, 1412, and 1414, a pathloss matrix is predicted. The pathloss matrices can be obtained by carrying out the operations in flowchart 1300. As a result, the RoI 1402 will have pathloss information for each of the base stations 1404, 1406, and 1408.

Receive power can be calculated for the areas within the RoI 1402 with reference to the transmit power and antenna radiation patterns for each of the base stations 1404, 1406, and 1408. Each area in the RoI 1402 can be assigned to the cell with the strongest receive power. The signal power from the attached cell can be treated as receive signal power and receive power from the other two cells can be treated as interference. Accordingly, SINR can be calculated for each area in the RoI 1402.

In another embodiment, the pathloss prediction regions of each of the selected base stations may not cover the entire RoI 1402. Accordingly, for areas in RoI 1402 that include a coverage prediction from multiple base stations, a UE association can be made to the base station with the highest received power, computed using one or more of transmit power, antenna gain, and pathloss values. For computing the interference power from other base stations, a statistical channel model, such as a COST 231 model, can be adopted.

Figure 15:
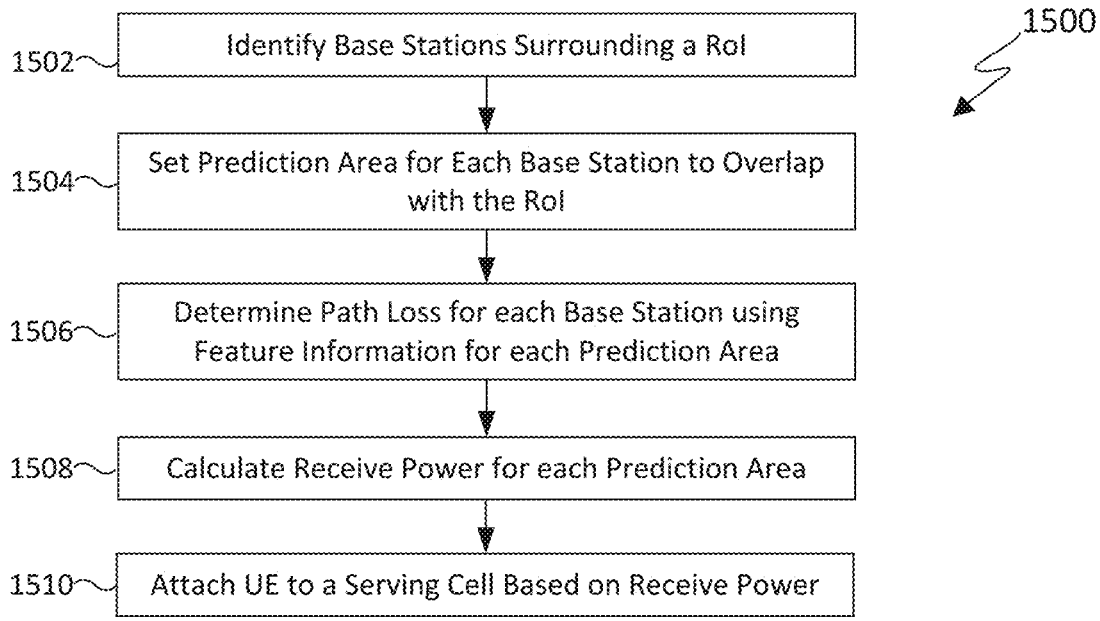
FIG. 15 illustrates a flowchart for coverage prediction according to various embodiments of this disclosure.

FIG. 15 illustrates a flowchart for coverage prediction according to various embodiments of this disclosure. Operations in flowchart 1500 can be implemented by a server, such as server 200 in FIG. 2, in a networked computing system, such as networked computing system 100 in FIG. 1.

Coverage prediction according to flowchart 1500 is achieved by using predicated pathloss. In operation 1502, base stations surrounding an RoI are selected. In operation 1504, a prediction area for each of the selected base stations is set to encompass the RoI. In operation 1506, pathloss for each base station is determined using feature information for each prediction area. In operation 1508, receive power is calculated for each prediction area using pathloss. UEs are attached to a serving cell based on receive power in operation 1510.

Figure 16:
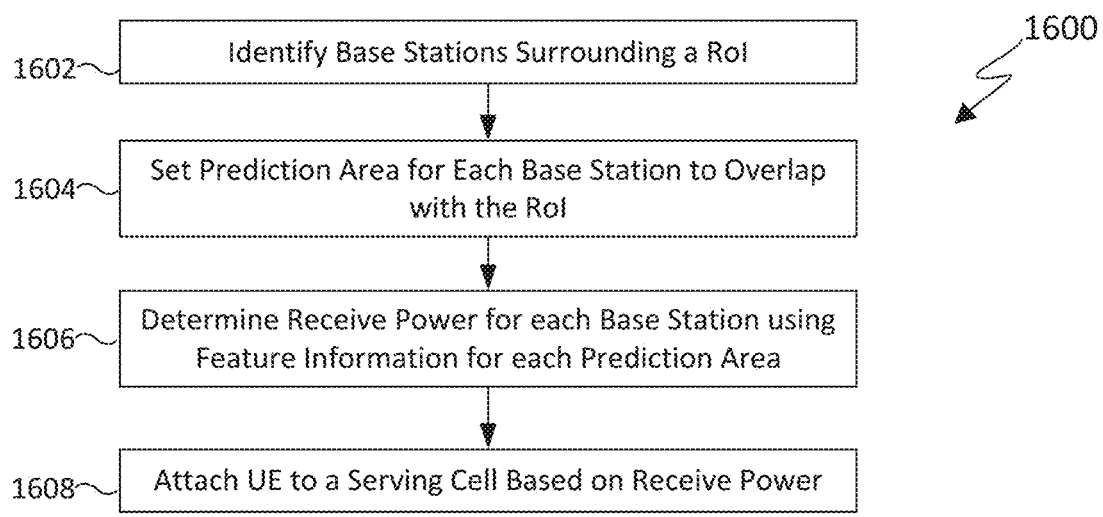
FIG. 16 illustrates a flowchart for coverage prediction according to various embodiments of this disclosure.

FIG. 16 illustrates a flowchart for coverage prediction according to various embodiments of this disclosure. Operations in flowchart 1600 can be implemented by a server, such as server 200 in FIG. 2, in a networked computing system, such as networked computing system 100 in FIG. 1.

Coverage prediction according to flowchart 1600 is achieved by using predicted receive power. The flowchart 1600 begins in operation 1602 by selecting base stations around an RoI. Similar to base station selection in flowchart 1500, the selection of surrounding base stations can be based on a criterion that the base stations are within a threshold distance to the center of the RoI, or a criterion that the surrounding base stations are within a threshold distance from the edges of the RoI, or a criterion that base stations are selected if the signal power received at any point in the RoI is greater than a threshold value.

In operation 1604, a prediction region is set for each of the selected base stations to also encompass the RoI. In operation 1606, receive power is obtained for each prediction area. The predicted receive power can be in the form of a receive power matrix and can be generated with input that includes feature input matrices corresponding to each of the prediction areas. Upon completion of operation 1606, the RoI will have all the received power to the selected base stations surrounding the RoI.

In operation 1608, each of the areas in the RoI is assigned to the cell with the strongest received power. The signal power from the attached cell will be treated as received signal power and the receive power from the other cells will be regarded as interference. SINR can be obtained for each of the areas in the RoI. However, in another embodiment, a SINR matrix could be the output of the neural network if the input to the neural network includes a combination of building height matrix $B_r$, tree height matrix $TR_r$, terrain height matrix $TE_r$, LOS/NLOS matrix $L_r$, clutter matrix $C_r$, antenna radiation matrix $G_r$, transmit power matrix Pt, etc.

Figure 17:
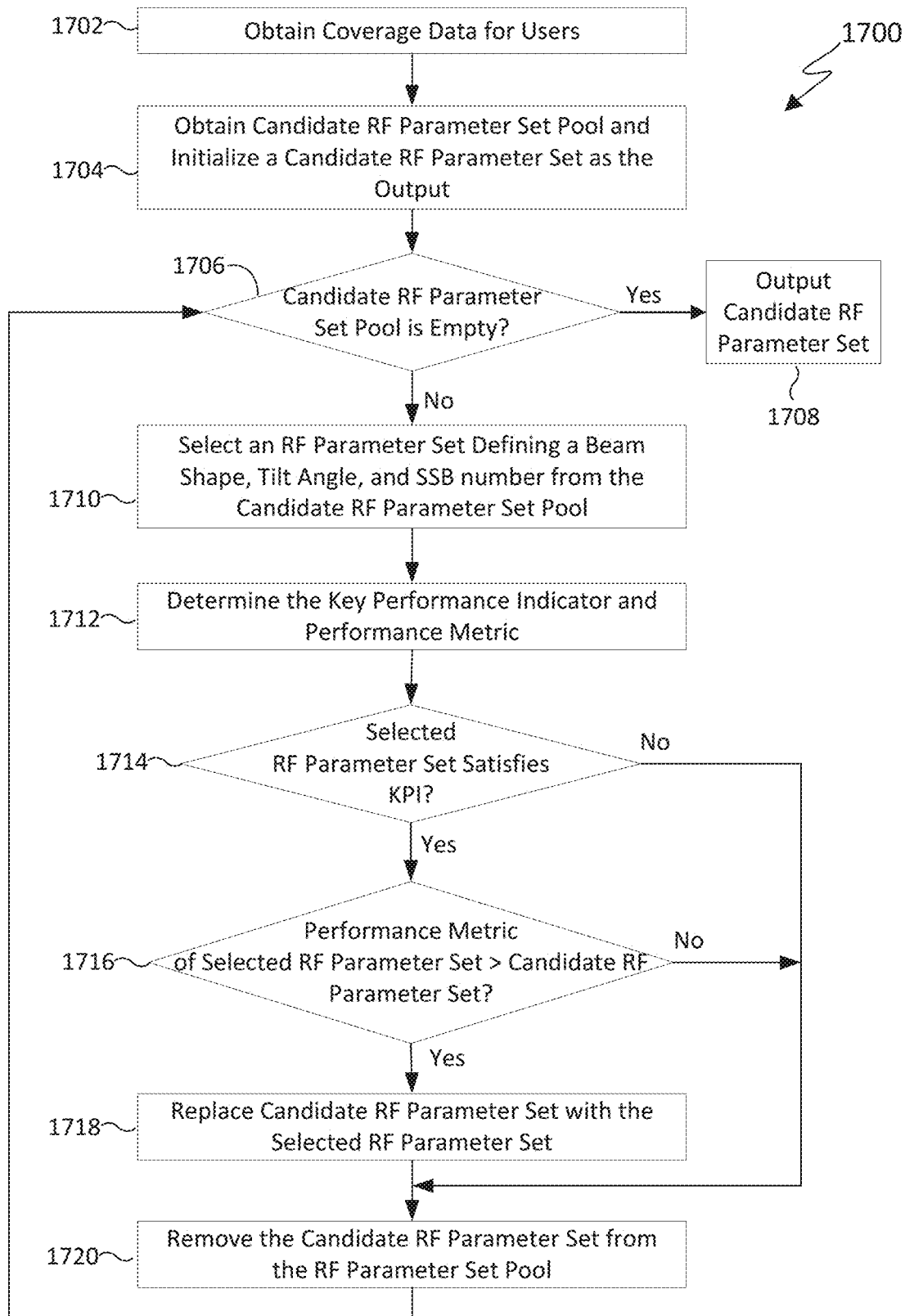
FIG. 17 illustrates a flowchart for generating optimized RF parameters according to various embodiments of this disclosure.

FIG. 17 illustrates a flowchart for generating optimized RF parameters according to various embodiments of this disclosure. The steps of flowchart 1700 can be implemented by a server, such as server 200, located in a computing system, such as computing system 100 in FIG. 1. As used herein, "optimize" or "optimized" means that a set of RF parameters have been selected which satisfy one or more predetermined KPIs and system performance metrics, and not that a perfectly optimized set of RF parameters is achieved.

In one embodiment, the input to flowchart 1700 is ray-tracing data that includes azimuth angle of arrival, azimuth angle of departure, zenith angle of arrival, zenith angle of departure, power-per-path, etc. The output of this embodiment is a set of RF parameters that can include antenna beam width, tilt angles, number of SSBs, and transmit power, among others. In at least some embodiments, a set of RF parameters is denoted as $p=(w_a, w_e, \theta, N)$, where $w_a$, $w_e$, $\theta$, N stands for azimuth domain beam width, elevation domain beam width, tilt angle and number of SSB, respectively.

In another embodiment, the input data can be coverage prediction data that indicates pathloss for each user. Regardless of the form of the input data, one RF parameter set is selected from a pool of available RF parameter sets. The pool of available RF parameter sets can be generated by identifying all the possible combinations of each of the available parameters.

One or more key performance indicators (KPIs) can be calculated for a base station to determine whether each of the RF parameter sets could pass the KPI requirement. In a non-limiting embodiment, the KPI can be receive power calculated with reference to transmit power, antenna gain, and predicted pathloss as previously mentioned. Of all the RF parameter sets that can pass the KPI requirement, the optimized RF parameter set is the RF parameter set that has the highest performance metric. One example of the performance metric could be number of connected UEs, area of island region, or X percentile SINR, where X could be any value from 0 to 100.

Flowchart 1700 depicts the operations for selecting an optimized RF parameter set. The flowchart 1700 begins at operation 1702 by obtaining coverage data for users. In one embodiment, the coverage data may be ray-tracing data. In another embodiment, the coverage data is the coverage prediction data provided by flowchart 1300 in FIG. 13. In operation 1704, a candidate RF parameter set pool is obtained and a candidate RF parameter set is initialized as an output. The candidate RF parameter set is a default set of RF parameters that can be transmitted to a base station if a candidate RF parameter set pool cannot be obtained.

A determination is made in operation 1706 as to whether the candidate RF parameter set pool is empty. If the RF parameter set pool is empty, then the candidate RF parameter set is output in operation 1708. However, if the candidate RF parameter set pool is not empty, then a candidate RF parameter set defining a beam shape, tilt angle, and number of SSBs are selected from the candidate RF parameter set pool in operation 1710.

In operation 1712, a key performance indicator (KPI) and performance metric is determined. Non-limiting examples of the KPI can include receive power. Non-limiting examples of the performance metric can include a number of connected UEs, an area of island region, or X percentile SINR, where X could be any value from 0 to 100.

In operation 1714 a determination is made as to whether the selected candidate RF parameter set satisfies the KPI. If the selected RF parameter set satisfies the KPI, then the flowchart 1700 proceeds to operation 1716 where a determination is made as to whether a performance metric of the selected RF parameter set is better than a performance metric of the candidate RF parameter set. If the performance metric of the selected RF parameter set is better than the candidate RF parameter set, then flowchart 1700 proceeds to operation 1718 where the candidate RF parameter set is replaced with the selected RF parameter set. In operation 1720 the candidate RF parameter set is removed from the RF parameter set pool and the flowchart returns to operation 1706.

Returning to operation 1714, if a determination is made that the selected RF parameter set does not satisfy the KPI, then flowchart 1700 proceeds to step 1720 and the candidate RF parameter set is removed from the RF parameter set pool.

Returning to operation 1716, if a determination is made that the performance metric of the selected RF parameter set is not better than the performance metric of the candidate RF parameter set, then flowchart 1700 proceeds to step 1720 and the candidate RF parameter set is removed from the RF parameter set pool.

Accordingly, flowchart 1700 iteratively tests each of the RF parameter sets in the RF parameter set pool to determine the RF parameter set that satisfies the requisite KPI and has the best relative performance metric.

Figure 18:
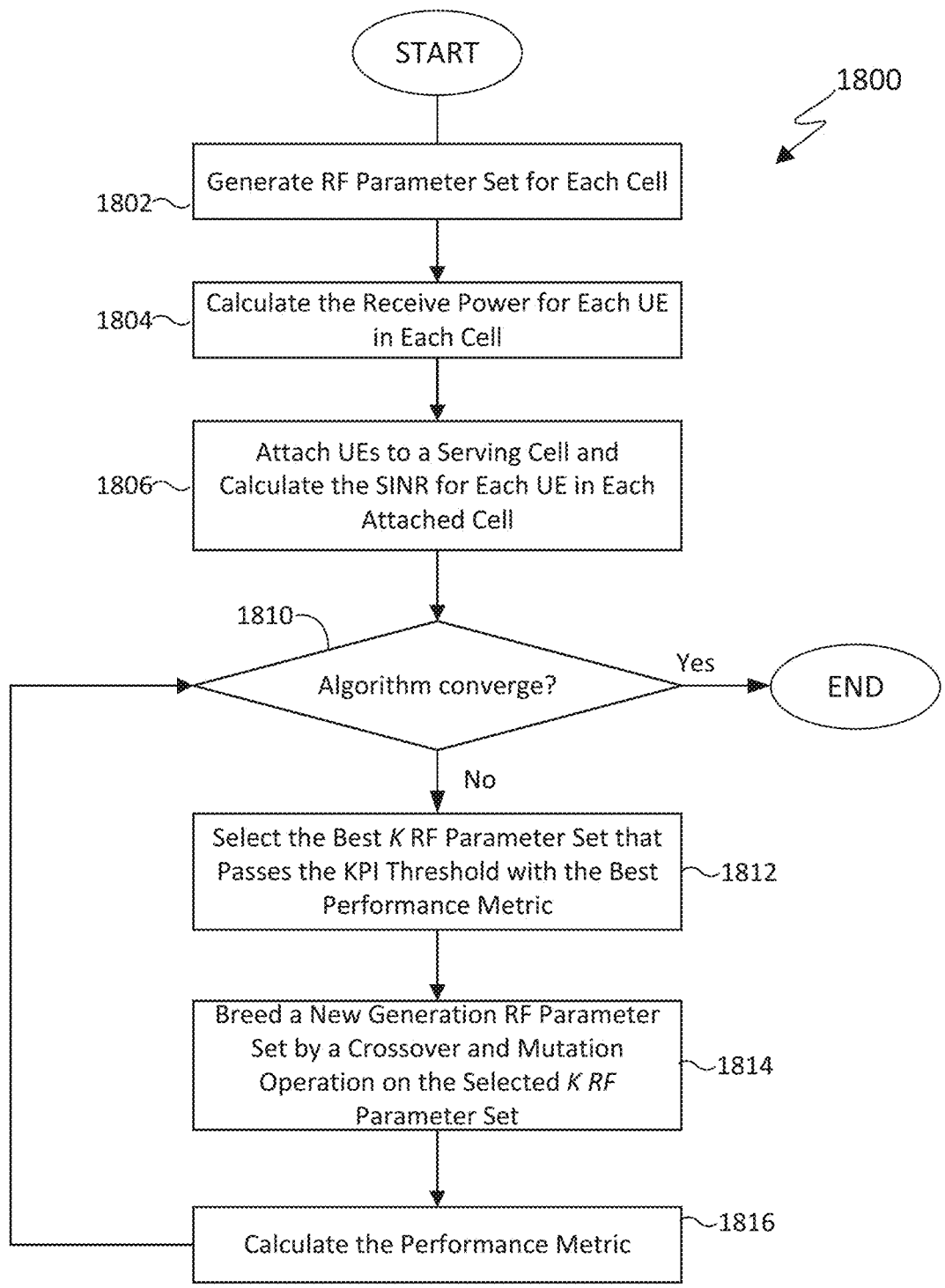
FIG. 18 illustrates a flowchart for optimizing RF parameter sets for multiple sites according to various embodiments of this disclosure.

FIG. 18 illustrates a flowchart for optimizing RF parameter sets for multiple sites according to various embodiments of this disclosure. The steps of flowchart 1800 can be implemented by a server, such as server 200, located in a computing system, such as computing system 100 in FIG. 1.

The flowchart 1800 starts at operation 1802 by generating an RF parameter set for each cell. In operation 1804 receive power for each UE in each cell is calculated. In operation 1806 UEs are attached to a serving cell and SINR is calculated for each UE in each attached cell. In a non-limiting embodiment, UEs are attached to a serving cell based on strength of the receive power.

In operation 1810 a determination is made as to whether an algorithm converges. In one embodiment, convergence can be determined by comparing the calculated SINR with a threshold. If the algorithm converges, then the flowchart ends. Otherwise, if the algorithm does not converge, then the flowchart proceeds to operation 1812 where the best K RF parameter set that passes the KPI threshold with the best performance metric.

In operation 1814, a new generation RF parameter set is bred by crossover and mutation using the selected K RF parameter set, and in operation 1816 a performance metric is calculated (i.e., SINR) using the new RF parameter set and the flowchart returns to operation 1810 to make the determination as to whether the algorithm converges.

Performance metrics are used in each of flowcharts 1700 and 1800 in FIGS. 17 and 18, respectively. One non-limiting example of the performance metric includes island regions. An island region is a portion of a coverage area associated with a target serving cell but which is surrounded by the main coverage area of a different serving cell. Island regions may be subject to frequent handover. The concept of island regions is graphically depicted in FIG. 19.

Figure 19:
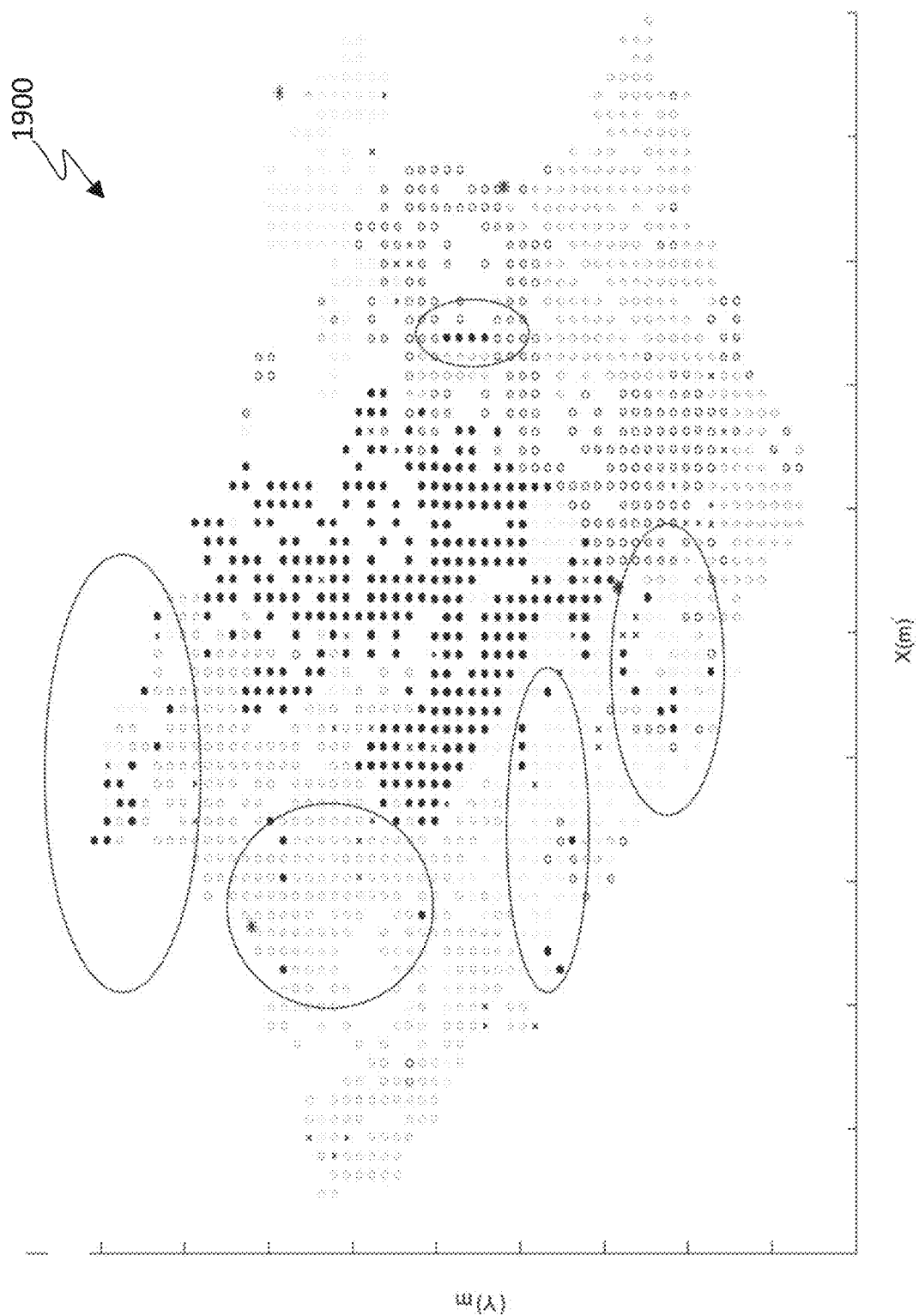
FIG. 19 illustrates island regions for a target cell according to various embodiments of this disclosure.

FIG. 19 illustrates island regions for a target cell according to various embodiments of this disclosure. Coverage areas for a plurality of cells are depicted in a graphical format with x- and y-axis representing a distance in meters. Each circle represents a measurable area, such as a 10-meter by 10-meter square. The total coverage area for the target cell is shown by the darkened circles. The main coverage area of the target cell is represented by the contiguous filled circles and the island regions are located separate from the main coverage area and circled to simplify identification. UEs located in the island regions may experience frequent handover between the target cell and another cell with a main coverage area that surrounds the island region(s).

Figure 20:
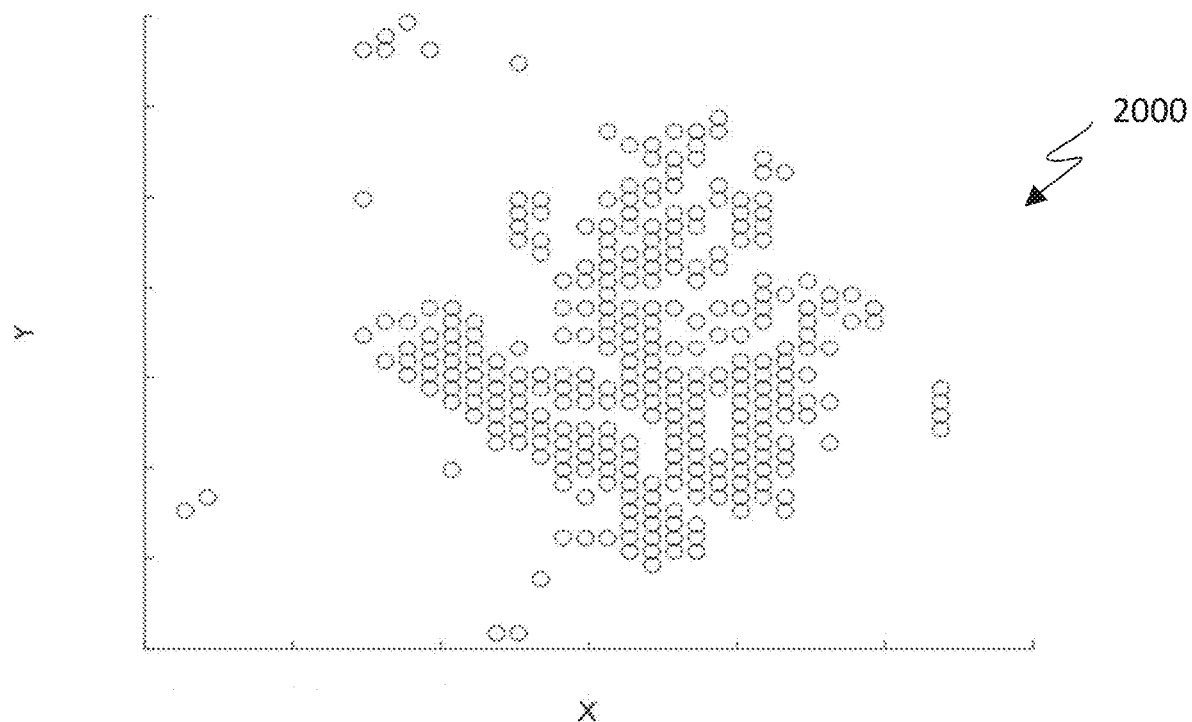
FIG. 20 illustrates a coverage map according to various embodiments of this disclosure.

Island regions can be identified by first creating a coverage map that places locations on a map based on a system performance metric, as shown in FIG. 20. Thereafter, connections are identified between locations based on distance whereby the largest contiguous area is deemed a main coverage area and the other areas are treated as island regions, as shown in FIG. 21.

FIG. 20 illustrates a coverage map according to various embodiments of this disclosure. The coverage map can be generated by a server, such as server 200 in FIG. 2, in a networked computing system, such as networked computing system 100 in FIG. 1. In one embodiment, the coverage map is generated using the output from a neural network configured to provide coverage predictions.

For each RF parameter set in a pool of RF parameter sets for the target cell, a coverage map can be generated by first calculating RSRP. If the RSRP is larger than a predefined threshold, then the corresponding area is identified on the coverage map. In this illustrative embodiment, each area with an RSRP that exceeds a received power threshold value is identified on the coverage map 2000 by a circle. Thereafter, connections can be identified between selected circles to identify a main coverage area and island areas.

Figure 21:
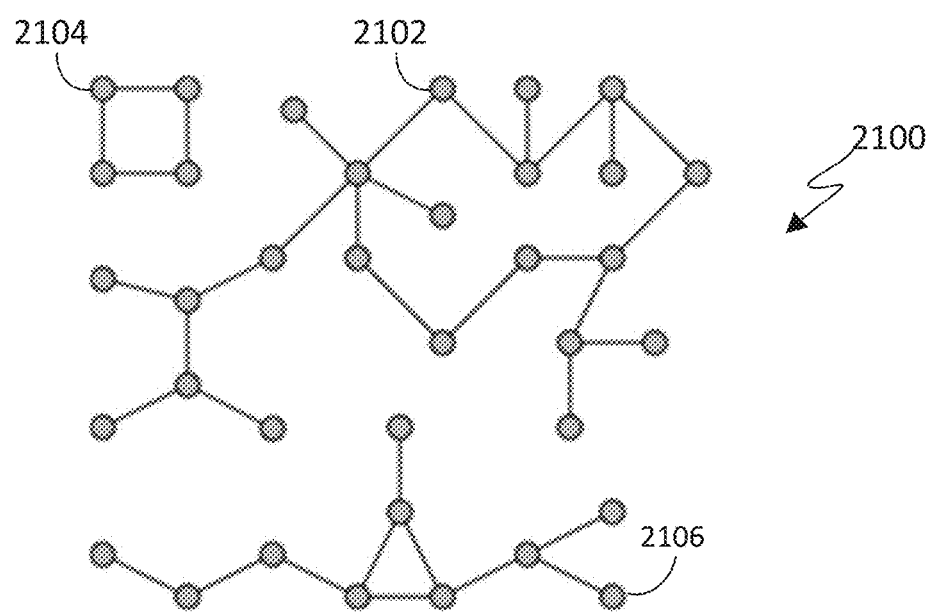
FIG. 21 illustrates connected figures for identifying island regions according to various embodiments of this disclosure.

FIG. 21 illustrates connected figures for identifying island regions according to various embodiments of this disclosure. After the coverage map is completed, connections can be identified between neighboring circles that are separated by distances that are smaller than a distance threshold. In a non-limiting embodiment, connected figures can be generated that shows connections between neighboring circles. A connected figure is the figure indicates the neighbor connection of a coverage figure.

In a non-limiting embodiment, the connected figure is generated by treating each circle as a vertex of the connected figure and if the distance between two vertices are smaller than a threshold, an edge between the corresponding vertexes is added.

After getting the connected graph, breadth-first search can be used to find the connected vertices in the graph. The largest connected figure (i.e., the connected figure spanning the largest area) will be the main coverage area. Other connected components will be regarded as the island region. In FIG. 21, connected FIG. 2102 represents the main coverage area and connected FIGS. 2104 and 2106 are considered island regions.

For each RF parameter set, its island area could be determined. The RF parameter selection could be done by selecting the RF parameter set with the smallest island region and could pass the KPI requirement.

Figure 22:
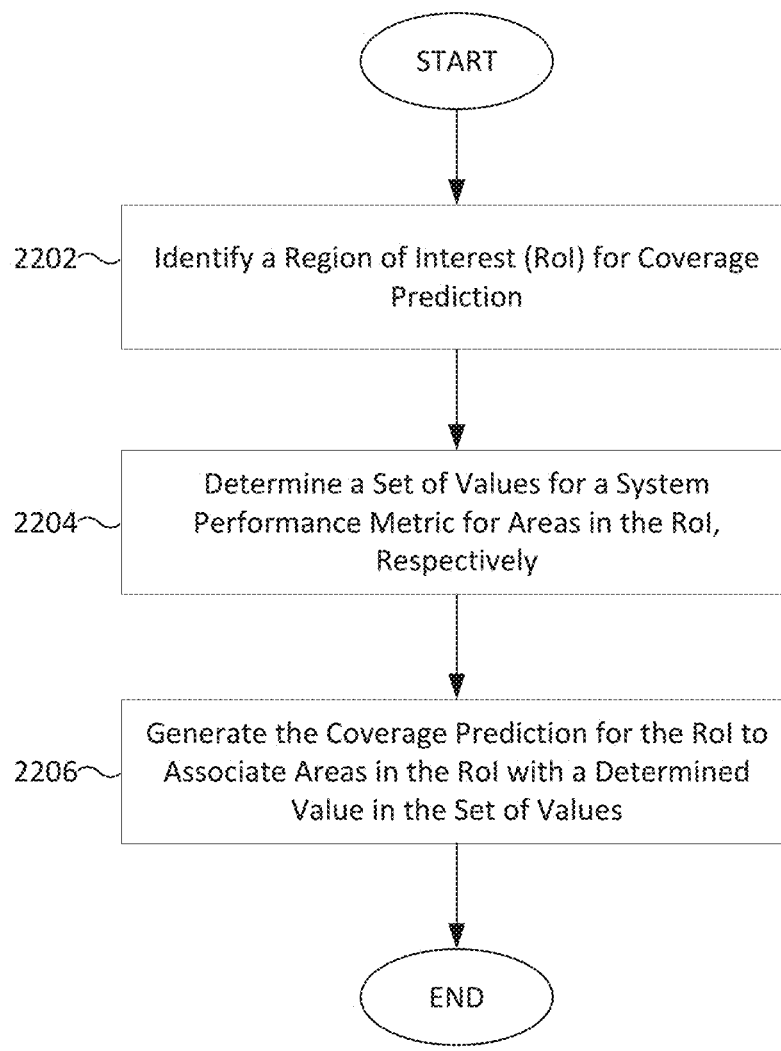
FIG. 22 illustrates another flowchart for coverage prediction according to various embodiments of this disclosure.

FIG. 22 illustrates a flowchart for coverage prediction in wireless networks according to various embodiments of this disclosure. Operations in flowchart 2200 can be implemented by a server, such as server 200 in FIG. 2, in a networked computing system, such as networked computing system 100 in FIG. 1.

In operation 2202, an RoI is identified for the coverage prediction.

In operation 2204, a set of values for a system performance metric is determined for areas in the ROI, respectively. The set of values for the system performance metric can be determined by a neural network, such as neural network 232 in FIG. 2, trained with a plurality of data samples for a set of RoIs. The plurality of data samples includes at least one of building height, terrain height, foliage height, clutter data that classifies land cover, line-of-sight indication data, antenna height, and ground truth data for the system performance metric. In a non-limiting embodiment, at least some of the data in the data samples are provided as two-dimensional images or matrices. For example, the building height provided in the data sample may be a two-dimensional image, as shown in FIG. 5, or a two-dimensional integer-encoded matrix where pixel color or integer value can represent a height value or a range of height values.

In operation 2206, a coverage prediction is generated for the ROI which associates areas in the RoI with a determined value in the set of values. Thus, the coverage prediction is capable of providing predicted system performance metrics (e.g., pathloss) for areas in the RoI.

In some embodiments, where the coverage prediction is to be generated for a target RoI that has not yet been analyzed (i.e., not within the set of RoIs used to train the neural network), operation 2202 can also include receiving feature information specific to the target RoI and encoding the feature information for the target RoI into a set of pixels or a set of integers. In some embodiments, if the line-of-sight indication for the RoI is not available as input, the line-of-sight indication for the RoI can be computed. The feature information can include at least one of building height of the RoI, terrain height of the RoI, antenna height of the RoI, foliage height of the RoI, line-of-sight indication for the RoI, and clutter data of the RoI which classifies land cover. Accordingly, the set of values for the system performance metric can be determined using the quantized feature information.

In some embodiments the system performance metric can include receive power, received signal strength, or reference signal received power when the plurality of data samples also includes antenna radiation data and antenna transmit power, and operation 2202 of FIG. 22 can include obtaining feature information for the RoI which includes building height, terrain height, foliage height, clutter data that classifies land cover, line-of-sight indication data, antenna height, transmit antenna radiation data, transmit power data, signal bandwidth, and receive antenna radiation data. The resultant coverage prediction from the neural network associates the areas in the RoI with a receive power values, received signal strength values, or reference signal received power values from the set of values.

In some embodiments, the system performance metric can be pathloss and the coverage prediction can include both pathloss and another system performance metric, such as receive power. Thus, generation of the coverage prediction in operation 2206 of FIG. 22 can also include determining antenna gain for the areas in the RoI; calculating receive power for the areas in the RoI based on antenna power, the antenna gain for the areas in the RoI, and the pathloss for the areas in the RoI; and updating the coverage prediction to include receive power values for the areas in the RoI.

In some embodiments, the system performance metric includes signal-to-interference-plus-noise ratio (SINR), and operation 2202 also includes selecting one or more regions in a vicinity of the RoI with corresponding base stations, and operation 2204 also includes generating a receive power prediction for the one or more regions in the vicinity of the RoI from the corresponding base stations so that the receive power prediction for the one or more regions in the vicinity of the RoI overlaps with the RoI. Operation 2204 can also include assigning a receive signal power based on a strongest receive power in the RoI, assigning other receive power and noise in the RoI as interference, and calculating the SINR in the RoI.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A server for coverage prediction for wireless networks, the server comprising:
   a memory storing instructions; and
   a processor operably connected to the memory, the processor configured to execute the instructions to cause the server to:
   identify a region of interest (RoI) for the coverage prediction;
   determine, using a neural network, a set of values for a system performance metric for areas in the RoI including pathloss, respectively, based on a plurality of data samples for a set of RoIs, and wherein the plurality of data samples include at least one of building height, terrain height, foliage height, clutter data that classifies land cover, line-of-sight indication data, antenna height, and ground truth data for the system performance metric;
calculate receive power values for the areas in the RoI based on antenna power, antenna gain for the areas in the RoI, and the pathloss for the areas in the RoI; and
generate the coverage prediction for the RoI, wherein the coverage prediction associates the areas in the RoI with a determined value in the set of values including the receive power values for the areas in the RoI.

2. The server of claim 1, wherein at least some of the plurality of data samples are images with differently colored pixels representing different heights, integer-encoded matrices for clutter classes, or both.

3. The server of claim 1, wherein the processor is further configured to execute the instructions to cause the server to:
receive feature information specific to the RoI, the feature information including at least one of building height of the RoI, terrain height of the RoI, antenna height of the RoI, foliage height of the RoI, and clutter data of the RoI which classifies land cover;
encode the feature information specific to the RoI into a set of pixels or a set of integers; and
determine the set of values for the system performance metrics using the encoded feature information.

4. The server of claim 1, wherein:
the plurality of data samples further includes antenna radiation data and antenna transmit data, and
wherein the processor is configured to execute the instructions to cause the server to obtain feature information for the RoI, the feature information including building height, terrain height, foliage height, clutter data that classifies land cover, line-of-sight indication data, antenna height, transmit antenna radiation data, transmit power data, and receive antenna radiation data.

5. The server of claim 1, wherein the processor is configured to execute instructions for generating the coverage prediction to cause the server to determine the antenna gain for the areas in the RoI.

6. The server of claim 5, wherein the system performance metric includes signal-to-interference-plus-noise ratio (SINR), and wherein the processor configured to execute the instructions to cause the server to:
select one or more regions in a vicinity of the RoI;
generate a receive power prediction for the one or more regions in the vicinity of the RoI, wherein the receive power prediction for the one or more regions in the vicinity of the RoI overlap with the RoI;
assign a receive signal power based on a strongest receive power in the RoI;
assign other receive power and noise in the RoI as interference; and
calculate the SINR in the RoI.

7. The server of claim 5, wherein the processor is configured to execute the instructions to cause the server to:
identify, for a plurality of RF parameter sets for a base station, at least one key performance indicator (KPI) using the system performance metric;
determine a connectivity metric for the plurality of RF parameter sets;
identify a subset of RF parameters from the plurality of RF parameter sets which satisfies the at least one KPI;
select a candidate RF parameter set from the subset of RF parameters based on the connectivity metric; and
output the candidate RF parameter set to the base station.

8. The server of claim 7, wherein one of the at least one KPI is reference signal received power that exceeds a threshold, and wherein the processor is further configured to execute the instructions to cause the server to:
identify locations in the RoI satisfying the one KPI;
identify, for each of the locations in the RoI satisfying the one KPI, connections between neighbor locations within a threshold distance;
identify one or more areas formed from interconnected locations;
identify the largest of the one or more areas as a main coverage area;
categorize the remaining areas of the one or more areas as island regions; and
wherein the candidate RF parameter set outputted to the base station produces the island regions under a predefined threshold.

9. A method for coverage prediction for wireless networks, the method comprising:
identifying a region of interest (RoI) for the coverage prediction;
determining, using a neural network, a set of values for a system performance metric including pathloss for areas in the RoI, respectively, based on a plurality of data samples for a set of RoIs, and wherein the plurality of data samples include at least one of building height, terrain height, foliage height, clutter data that classifies land cover, line-of-sight indication data, antenna height, and ground truth data for the system performance metric;
calculating receive power values for the areas in the RoI based on antenna power, antenna gain for the areas in the RoI, and the pathloss for the areas in the RoI; and
generating the coverage prediction for the RoI, wherein the coverage prediction associates the areas in the RoI with a determined value in the set of values including the receive power values for the areas in the RoI.

10. The method of claim 9, wherein at least some of the plurality of data samples are images with differently colored pixels representing different heights, integer-encoded matrices for clutter classes, or both.

11. The method of claim 9, further comprising:
receiving feature information specific to the RoI, the feature information including at least one of building height of the RoI, terrain height of the RoI, antenna height of the RoI, foliage height of the RoI, line-of-sight indication for the RoI and clutter data of the RoI which classifies land cover; and
encoding the feature information specific to the RoI into a set of pixels or a set of integers; computing the line-of-sight indication for the RoI when not available as input,
wherein determining the set of values for the system performance metrics further comprises determining the set of values for the system performance metrics using the encoded feature information.

12. The method of claim 9, wherein the system performance metric includes one or more of: receive power, received signal strength, or reference signal received power, and wherein the plurality of data samples further includes antenna radiation data and antenna transmit power, the method further comprising:
obtaining feature information for the RoI, the feature information including building height, terrain height, foliage height, clutter data that classifies land cover, line-of-sight indication data, antenna height, transmit antenna radiation data, transmit power data, signal bandwidth and receive antenna radiation data; and wherein the coverage prediction further associates the areas in the RoI with received signal strength values or reference signal received power values from the set of values.

13. The method of claim 9, wherein generating the coverage prediction further comprises determining the antenna gain for the areas in the RoI.

14. The method of claim 13, wherein the system performance metric includes signal-to-interference-plus-noise ratio (SINR), the method further comprising:
selecting one or more regions in a vicinity of the RoI with corresponding base stations;
generating a receive power prediction for the one or more regions in the vicinity of the RoI from the corresponding base stations, wherein the receive power prediction for the one or more regions in the vicinity of the RoI overlap with the RoI;
assigning a receive signal power based on a strongest receive power in the RoI;
assigning other receive power and noise in the RoI as interference; and
calculating the SINR in the RoI.

15. The method of claim 13, wherein the method further comprises:
identifying, for a plurality of RF parameter sets for a base station, at least one key performance indicator (KPI) using the system performance metric;
determining a connectivity metric for the plurality of RF parameter sets;
identifying a subset of RF parameters from the plurality of RF parameter sets which satisfies the at least one KPI;
selecting a candidate RF parameter set from the subset of RF parameters based on the connectivity metric; and
outputting the candidate RF parameter set to the base station.

16. The method of claim 15, wherein one of the at least one KPI is reference signal received power that exceeds a threshold, the method further comprising:
identifying locations in the RoI satisfying the one KPI;
identifying, for each of the locations in the RoI satisfying the one KPI, connections between neighbor locations within a threshold distance;
identifying one or more areas formed from interconnected locations;
identifying the largest of the one or more areas as a main coverage area;
categorizing the remaining areas of the one or more areas as island regions; and
wherein the candidate RF parameter set outputted to the base station produces the island regions under a predefined threshold.

17. A non-transitory, computer-readable medium storing instructions that, when executed by a processor of a server, cause the server to:
identify a region of interest (RoI) for coverage prediction;
determine, using a neural network, a set of values for a system performance metric for areas in the RoI including pathloss, respectively, based on a plurality of data samples for a set of RoIs, and wherein the plurality of data samples include at least one of building height, terrain height, foliage height, clutter data that classifies land cover, line-of-sight indication data, antenna height, and ground truth data for the system performance metric;
calculate receive power values for the areas in the RoI based on antenna power, antenna gain for the areas in the RoI, and the pathloss for the areas in the RoI; and
generate the coverage prediction for the RoI, wherein the coverage prediction associates the areas in the RoI with a determined value in the set of values including the receive power values for the areas in the RoI.

18. The non-transitory, computer-readable medium of claim 17 storing further instructions that, when executed by the processor of the server, cause the server to:
receive feature information specific to the RoI, the feature information including at least one of building height of the RoI, terrain height of the RoI, antenna height of the RoI, foliage height of the RoI, and clutter data of the RoI which classifies land cover;
encode the feature information specific to the RoI into a set of pixels or a set of integers; and
determine the set of values for the system performance metrics using the encoded feature information.

19. The non-transitory, computer-readable medium of claim 17, wherein:
the plurality of data samples includes antenna radiation data and antenna transmit data, and
the non-transitory, computer-readable medium stores further instructions that, when executed by the processor of the server, cause the server to obtain feature information, the feature information including building height, terrain height, foliage height, clutter data that classifies land cover, line-of-sight indication data, antenna height, transmit antenna radiation data, transmit power data, and receive antenna radiation data for the RoI.

20. The non-transitory, computer-readable medium of claim 17, wherein the non-transitory, computer-readable medium stores further instructions that, when executed by the processor, cause the server to determine the antenna gain for the areas in the RoI.

* * * * *